(12) United States Patent
Vanga et al.

(10) Patent No.: US 8,533,109 B2
(45) Date of Patent: Sep. 10, 2013

(54) PERFORMANCE OF CONTROL PROCESSES AND MANAGEMENT OF RISK INFORMATION

(75) Inventors: Ram Mohan Reddy Vanga, Atlanta, GA (US); Anita Roth, Phoenix, AZ (US); Jeff Roth, Phoenix, AZ (US)

(73) Assignee: Operational Risk Management, LLC, Phoenix, AZ (US)

( * ) Notice: Subject to any disclaimer, the term of this patent is extended or adjusted under 35 U.S.C. 154(b) by 347 days.

(21) Appl. No.: 12/544,142

(22) Filed: Aug. 19, 2009

(65) Prior Publication Data

US 2010/0049748 A1 Feb. 25, 2010

Related U.S. Application Data

(60) Provisional application No. 61/090,689, filed on Aug. 21, 2008.

(51) Int. Cl.
*G06Q 10/00* (2012.01)

(52) U.S. Cl.
USPC .......................................................... 705/38

(58) Field of Classification Search
USPC ............... 707/E17.005, 944, 999.1; 705/1.1, 705/7.12, 7.13, 7.17, 7.23, 7.28, 7.38
See application file for complete search history.

(56) References Cited

U.S. PATENT DOCUMENTS

| 7,143,066 | B2* | 11/2006 | Shear et al. ..................... 705/54 |
| 7,337,124 | B2* | 2/2008 | Corral ........................... 705/7.17 |
| 7,899,756 | B2* | 3/2011 | Rizzolo et al. ................. 705/300 |
| 2004/0044615 | A1* | 3/2004 | Xue et al. ......................... 705/38 |
| 2004/0260583 | A1* | 12/2004 | King et al. ......................... 705/7 |
| 2004/0260591 | A1* | 12/2004 | King ................................. 705/8 |
| 2005/0120032 | A1* | 6/2005 | Liebich et al. ................. 707/100 |
| 2006/0129441 | A1* | 6/2006 | Yankovich et al. ............... 705/8 |
| 2007/0055564 | A1* | 3/2007 | Fourman ......................... 705/11 |
| 2007/0150330 | A1* | 6/2007 | McGoveran ...................... 705/8 |
| 2007/0265900 | A1* | 11/2007 | Moore ............................... 705/8 |
| 2008/0015920 | A1* | 1/2008 | Fawls et al. ....................... 705/8 |
| 2008/0077530 | A1* | 3/2008 | Banas et al. .................... 705/50 |
| 2009/0204467 | A1* | 8/2009 | Rubio et al. ...................... 705/9 |

OTHER PUBLICATIONS

Unpublished document titled "Description of Legacy Software Product Licensed by Operational Risk Management" for legacy software developed by assignee Operational Risk Management and licensed to Household Bank prior to date of Aug. 21, 2007 (6 pages of description, and 6 sheets of attached figures including Figures 1-4).

* cited by examiner

*Primary Examiner* — Charles Kim
*Assistant Examiner* — Randall Burns
(74) *Attorney, Agent, or Firm* — Greenberg Traurig, LLP

(57) ABSTRACT

Control processes are managed within an organization, the organization including a plurality of divisions, by receiving process data provided from a first local user associated with a first division of the organization, the first local user providing the data via a first user interface, and the data defining one or more processes associated with the first division. The process data is stored in a database to be associated with the first division. The stored process data is provided to a second local user, associated with a second division of the organization, for selection of a process associated with the first division. The selection of the second user is received and stored in the database as further being associated with the second division.

13 Claims, 30 Drawing Sheets

Sample selection from Control Input Screen (Legacy Application)

|  | Yes | No |
|---|---|---|
| Was the credit application complete? | ● | ○ |
| Was the consumer's credit request declined? | ● | ○ |
| Was an adverse action notice provided within 30 days? | ○ | ○ |

[Save] [Abort]

FIG. 3

Business processes used in other divisions that are available for linking to your division *(select one or many)*:

☐ Process 1

☐ Process 2

☐ Etc.

[ Link selected process(es) ]  [ Add new process ]

FIG. 11

*User Preferences Interface*

| | |
|---|---|
| User Name: [pre-populated from log-on]<br>Email address: XXXXXXXXXX<br><br>Preferences *(select one)*:<br>☐ Notify upon addition by any division within the organization.<br>☐ Notify upon addition by only those divisions selected below:<br>　　☐ Division 1<br>　　☐ Division 2<br>　　☐ Etc.<br>☐ Do not notify | Save |

FIG. 12

Risks identified by other divisions available for linking *(select one or many)* :

☐ XXXXXXXXXXXXXXXXXXX

☐ YYYYYYYYYYYYYYYYYYY

☐ Etc.

| Link selected risk(s) | Add new risk |
|---|---|

FIG. 13

Controls identified by other divisions available for linking (select one or many):

☐ XXXXXXXXXXXXXXXXXXX

☐ YYYYYYYYYYYYYYYYYYY

☐ Etc.

| Link selected risk(s) | | Add new control |

FIG. 14

*Data Link Set-up and Maintenance Fields*

1) Data Link Name: XXXXXXXXXXXXXXXXXXXX

2) Source Database: Microsoft Access, Microsoft SQL Server, Model 204 MySQL, IBM DB2, IBM IMS (Information Management System), Informix, Sybase, Teradata, Oracle, ORM Database 3) Server: XXXXXXXXXXXXXXX 4) Port: XXXXXX 5) Credentials: XXXXXXXXXXX Save

FIG. 17

*Data Collection Set-up and Maintenance Fields*

| | | |
|---|---|---|
| | 1) Data Collection: XXXXXXXXXXXXXXXXXXXX<br><br>2) Data Tables: [user can select any or all tables that apply]<br>☐ Table 1<br>☐ Table 2<br>☐ Etc. | Save |

FIG. 18

*Dataset Set-up and Maintenance Fields*

1) Dataset Name: XXXXXXX

2) Dataset Element Name: XXXXXXXXXXXXXXXX

3) Data Element: [Dropdown box of data collection information table columns]

4) Function: concatenate, add, subtract, multiply, divide, greater than, less than, equal, percentage, in, not in, etc.

5) Variable:

Data Element: [Dropdown box of data collection information table columns]
   Constant: Text, value or fixed date
   Variable Date: Today's Date or month or day as [1][0], or year as [2][0][0][0]

[ Add another data element ]
   [ Add a condition ]

6) Joining Operand: and, or, '(', ')': [select when adding an additional condition]

*Advanced Method*

1) Dataset Name: XXXXXXX

2) Data Element Name: XXXXXXXXXXXXXXXX

[ Enter a SQL statement ]

[ Add another data element ]

[ Save ]

FIG. 19

Source Data Contained in Data Files

*Data Extract Set-up and Maintenance Fields*

1) Data File Name: XXXXXXXXXXXXXXXXXXX

2) Source Data file: [drop down box]
   Microsoft Excel worksheet
   Flat file
   CSV (comma delimited fie)
   XML file 3) Source Location: XXXXXXXXXXXXXX 4) Append or Truncate

5) Lock or Unlocked

6) Frequency

Save

FIG. 21

*Control Tool Set-up and Maintenance Fields*

1) Control Tool Name: XXXXXXX

2) Frequency: daily, weekly, every 2 weeks, twice every month, every 4 weeks, monthly, every 2 months, every 3 months, every 6 months, every year 3) Time: XXXX 4) Control Tool Start Date: MM/DD/YYYY 5) Lock or Unlock

6) Control Tool Termination Date: MM/DD/YYYY

7) Control Tool Type: Dynamic, Static, Semi-Dynamic

[Additional Fields only if user selects 'Dynamic' or 'Semi-Dynamic']

A. Dataset: [Drop-down of available datasets]

[Additional Fields only if user selects 'Static' or 'Semi-Dynamic']

B. Grace Period: __ day(s)

[Save]

FIG. 22

*Control Tool Attribute Set-up and Maintenance Fields*
*Data Capture Attribute*

1) Control Tool Attribute: XXXXXXX
2) Control Tool Attribute Description: XXXXXXXXXXXXXXXXXX
3) Genesis Attribute: Y/N
4) Control Tool Attribute Type: Data Capture
5) Successor Control Tool Attribute Type:
   a. Single Successor Attribute: [Dropdown of available control tool attributes]
6) Control Tool Data Element: [Dropdown box of table columns and dataset elements]
7) Function: concatenate, add, subtract, multiply, divide, greater than, less than, equal, percentage, in, not in, etc.
8) Variable:
   Control Tool Data Element: [Dropdown box of table columns and dataset elements]
   Constant: Text, value or fixed date
   Variable Date: Today's Date or month or day as [1][0] , or year as [1][1][1][1]
   Data Capture Attribute: [Dropdown box of data capture control tool attributes]
   [ Add a condition ]
9) Joining operand: And, or, '(', ')' [select when adding an additional condition]

*Advanced Method*

Same as 1 through 5 above,

6) Advanced Data Capture Attribute
   [ Enter a SQL statement ]

[Save]

FIG. 23

*Control Tool Attribute Set-up and Maintenance Fields*
*Data Analysis Attribute*

1) Control Tool Attribute: XXXXXXX
2) Control Tool Attribute Description: XXXXXXXXXXXXXXXXXX
3) Genesis Attribute: Y/N
4) Control Tool Attribute Type: Data Analysis
5) Standard: Yes, No, N/A
6) Tolerable Error Rate: __%
7) Successor Control Tool Attribute Type:
   a. Single Successor Attribute: [Dropdown of available control tool attributes]
   b. Logical Successor Attribute:
      i. True Condition: [Dropdown of available control tool attributes]
      ii. False Condition: [Dropdown of available control tool attributes]
8) Control Tool Data Element: [Dropdown box of table columns and dataset elements]
9) Function: concatenate, add, subtract, multiply, divide, greater than, less than, equal, percentage, in, not in, etc.
10) Variable:
    Control Tool Data Element: [Dropdown box of table columns and dataset elements]
    Constant: Text, value or fixed date
    Variable Date: Today's Date or month or day as [1][0], or year as [1][1][1][1]
    Data Capture Attribute: [Dropdown box of data capture control tool attributes]
    [ Add a condition ]
11) Joining Operand: And, or, '(', ')' [select when adding an additional condition]

*Advanced Method*

Same as 1 through 7 above

8) Advanced Data Analysis Attribute
   [ Enter a SQL statement ]

FIG. 24

[ Save ]

Processes in common with other divisions that they have linked to the law, rule or regulation *(select one or many)*:

☐ Process 1

☐ Process 2

☐ Etc.

Processes of the business unit that are available for linking to the law, rule or regulation *(select one or many)*:

☐ Process 7

☐ Process 25

☐ Etc.

[ Link selected process(es) ]

FIG. 25

PERFORMANCE OF CONTROL PROCESSES AND MANAGEMENT OF RISK INFORMATION

RELATED APPLICATIONS

This application claims the benefit of U.S. Provisional Application No. 61/090,689, filed 21 Aug. 2008, which is fully incorporated by reference herein.

FIELD

At least some embodiments disclosed herein relate to computer information systems in general, and more particularly but not limited to, management of organizational process information.

BACKGROUND

Basel II, Sarbanes-Oxley, and increased regulatory scrutiny are the catalysts for a renewed emphasis on risk assessment and internal control. The regulatory environment has triggered significant efforts to identify, document and assess key operational, financial, and compliance risks, as well as primary control activities that mitigate these risks. However, the risk management exercise of identifying risks and documenting controls will have little impact on the flow of losses and violations or the reduction of risk exposure without active control management, which is more than just the providing of documentation. A desired objective of an effective risk management program is to have a more meaningful contribution to business results.

All organizations function through processes. If a risk management program is not process focused, the risk manager will lack visibility to segments of business risk, points of vulnerability in the process life cycle, and primary controls necessary to effectively mitigate the exposure points within the entire business process.

Everything the business does is executed through a process (e.g., new accounts origination, business continuity management, and payment posting). Although the process steps may vary from company to company, the underlying business processes themselves are generally uniform in nature within the same industry. There is a natural intersection between a process and risk. Risks exist because of the processes a business performs. A risk exposure occurs when the business executes a process with the inherent risk.

BRIEF DESCRIPTION OF THE DRAWINGS

The embodiments are illustrated by way of example and not limitation in the figures of the accompanying drawings in which like references indicate similar elements.

FIG. 3 shows a control input screen for performance of a manual review using a control module to conduct the review as directed by a legacy control tool according to an embodiment.

FIG. 11 shows a new page of a user interface with business processes used in other divisions according to an embodiment.

FIG. 12 shows a user preferences interface according to an embodiment.

FIG. 13 shows a new page with identified risks according to an embodiment.

FIG. 14 shows a new page with controls identified by other divisions according to an embodiment.

FIG. 17 shows data link set-up and maintenance fields according to an embodiment.

FIG. 18 shows data collection set-up and maintenance fields according to an embodiment.

FIG. 19 shows dataset set-up and maintenance fields according to an embodiment.

FIG. 21 shows data extract set-up and maintenance fields according to an embodiment.

FIG. 22 shows control tool set-up and maintenance fields according to an embodiment.

FIG. 23 shows control tool attribute set-up and maintenance fields for input of data capture attributes according to an embodiment.

FIG. 24 shows control tool attribute set-up and maintenance fields for input of data analysis attributes according to an embodiment.

FIG. 25 shows a page for a local user to select one or more of presented processes for linking to a law or regulation for the division associated with that local user according to an embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" or similar means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

All references to "ORM" herein are merely used for purposes of illustrating and discussing exemplary embodiments. No limitation is intended by the use of the phrase "ORM" in the description below as to the scope of coverage for the claims provided below or the range of possible embodiments in which the systems and methods described herein may be used.

I. Legacy ORM Risk and Control System

Figure 1A:
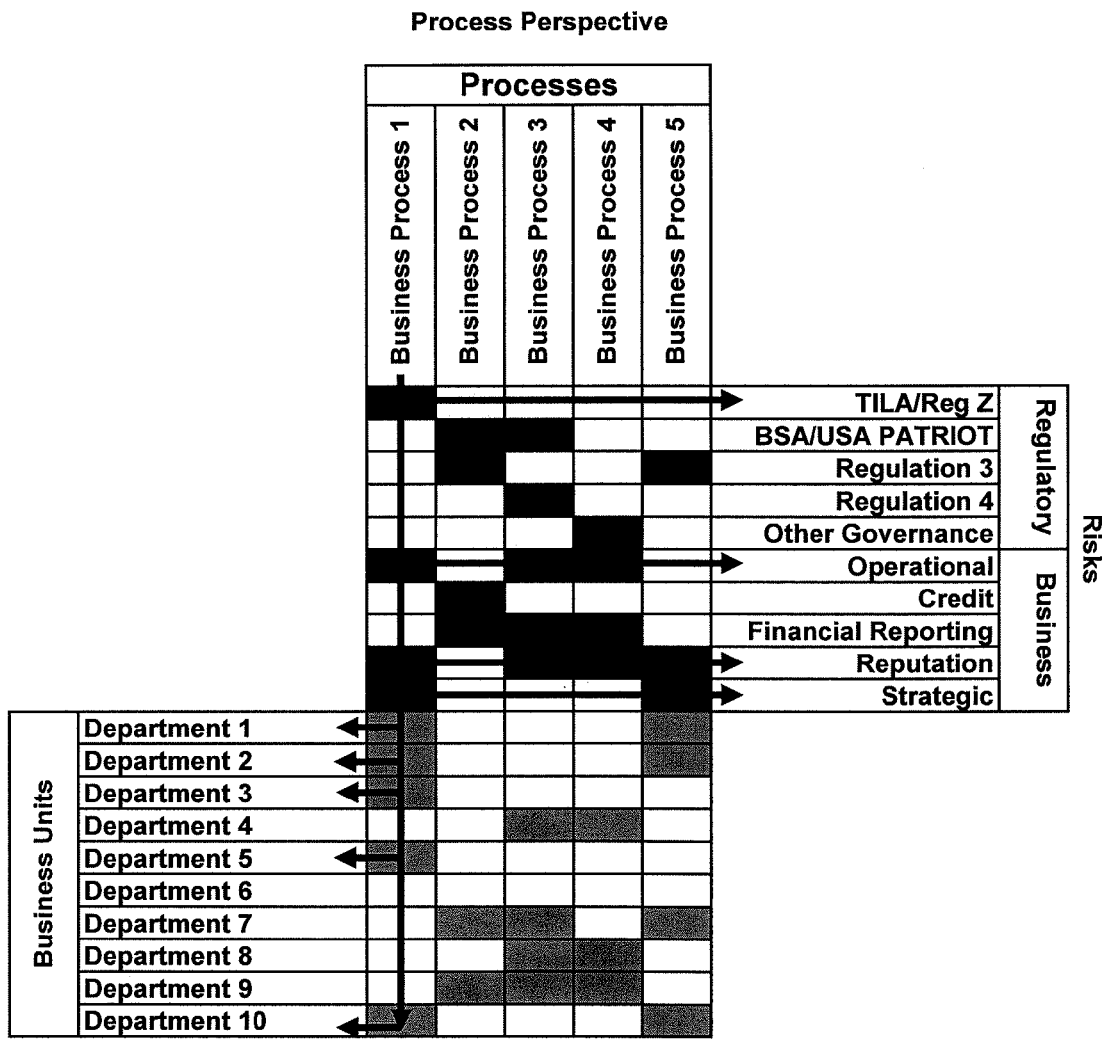
FIG. 1A shows a three-dimensional approach that manages risk and control from a process perspective according to an embodiment.
Figure 1B:
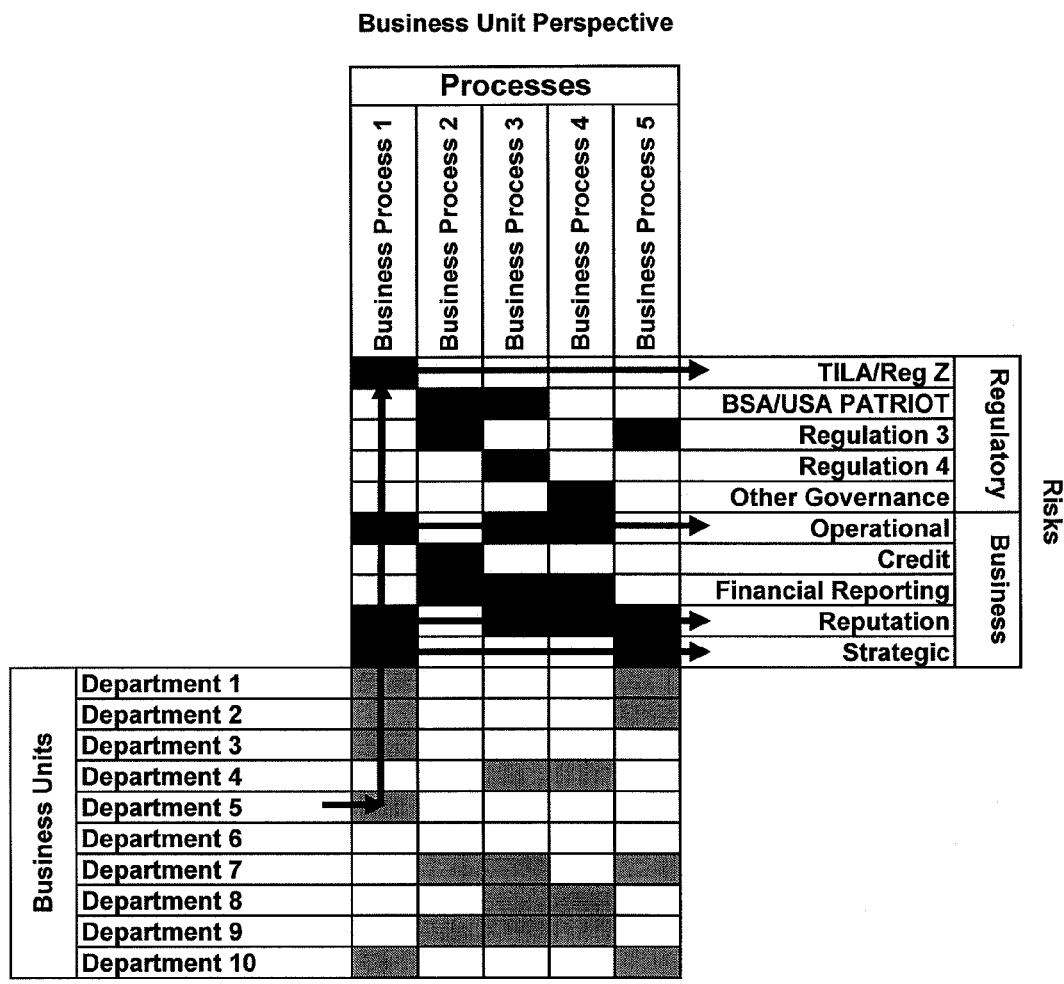
FIG. 1B shows a three-dimensional approach that manages risk and control from a business unit perspective according to an embodiment.
Figure 1C:
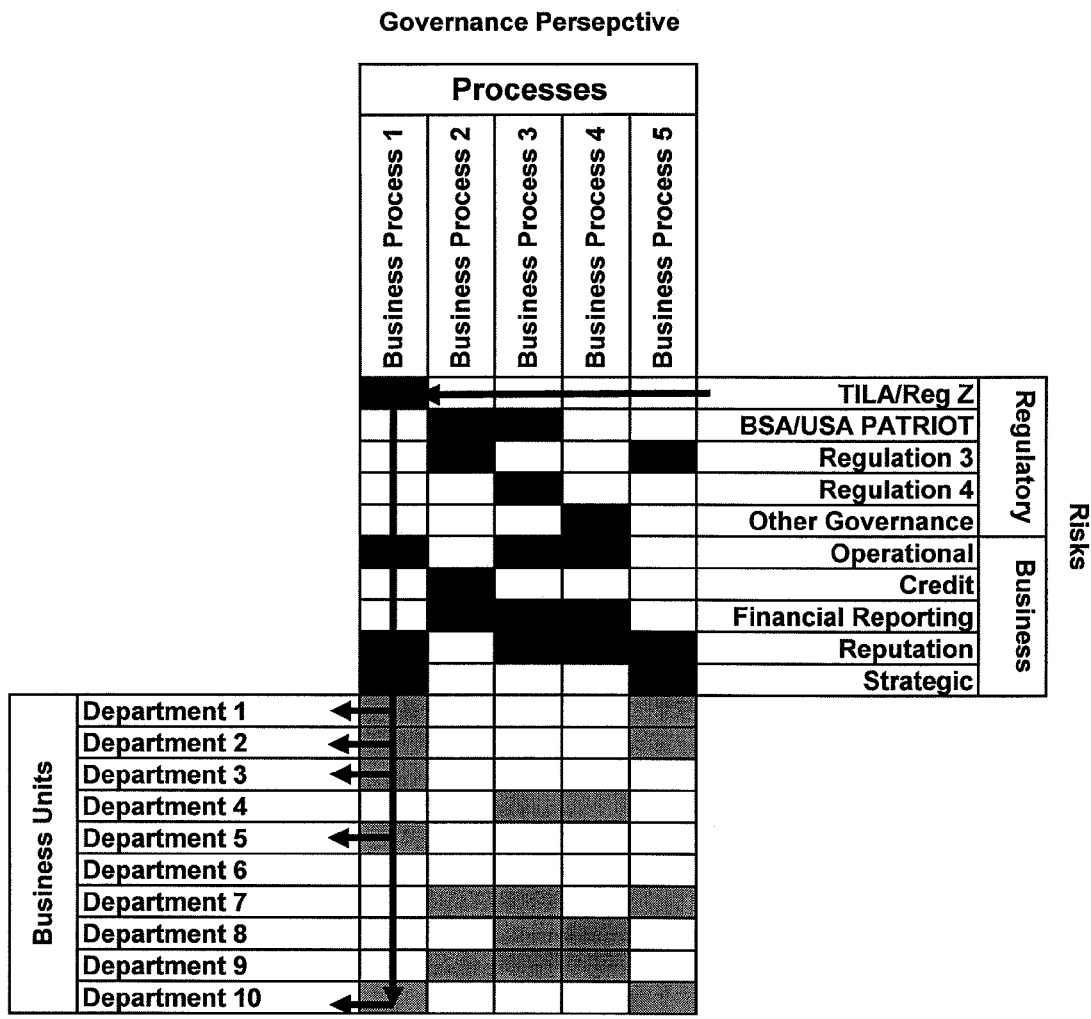
FIG. 1C shows a three-dimensional approach that manages risk and control from a governance perspective according to an embodiment.
Figure 6:
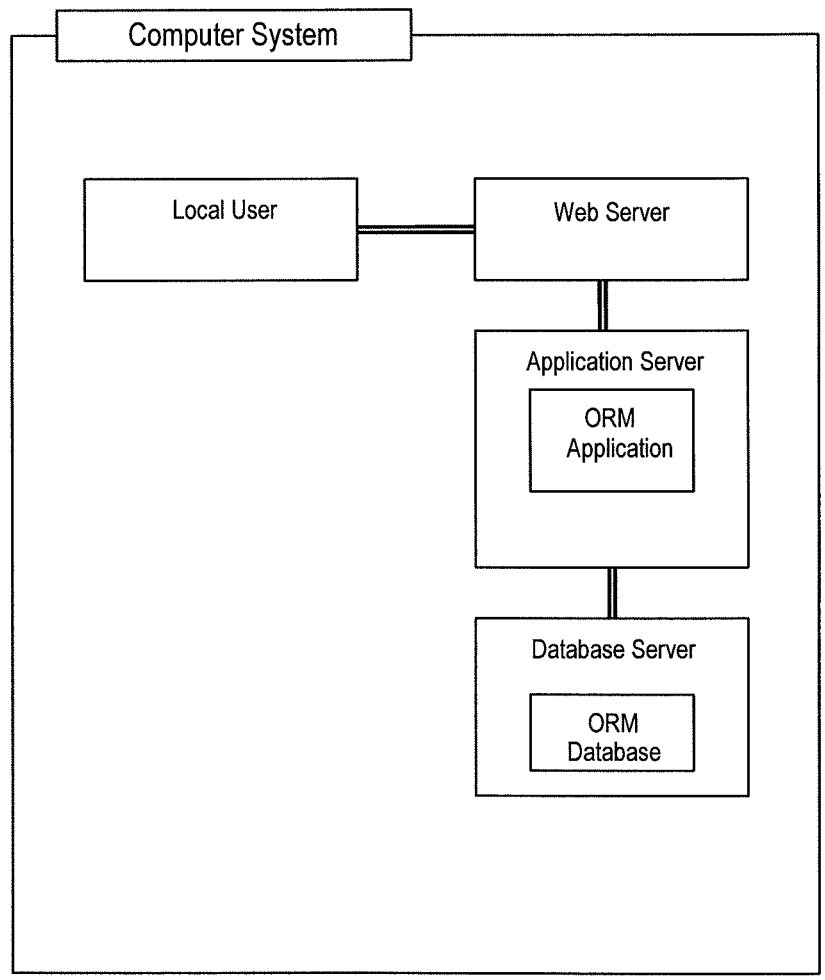
FIG. 6 shows a computer system to execute software modules and provide a local user with access to a web server according to an embodiment.

A method for identifying, documenting and managing business processes, risks and controls uses a three-dimensional approach that manages risk and control from process (see FIG. 1A), business unit (see FIG. 1B), and governance (see FIG. 1C) perspectives. This method was developed into a computer system that executes software modules and involves a local user accessing a web server (see illustration of computer system in FIG. 6). The figure describes the relationship between a local user, the web server, application server, and database server. Within the application server, the ORM application consists of two software modules: process module and control module. The ORM database resides within the database server and uses multiple data tables which are described later in the document.

Figure 4:
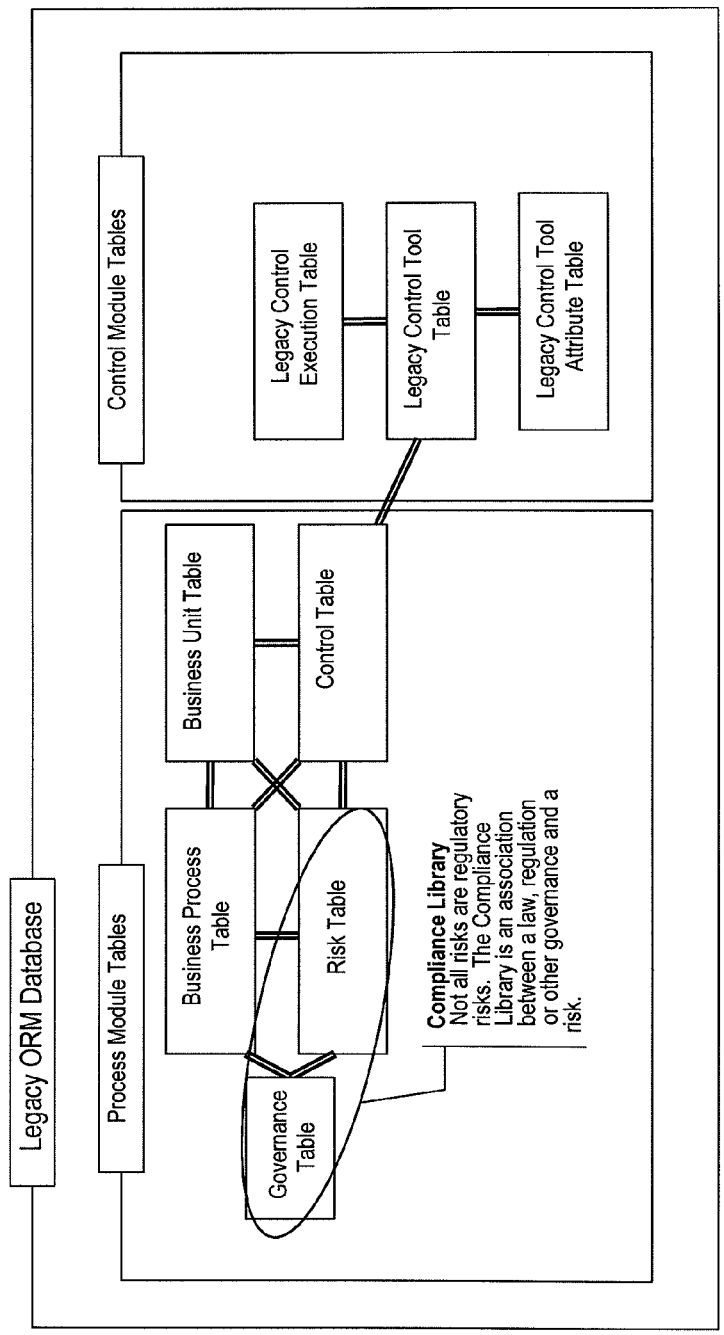
FIG. 4 shows tables and table relationships within a database that support process and control modules according to an embodiment.

Using a user interface within the process module of the ORM application within the computer system above, local users can input information about the business units (i.e., departments) of a specific division (e.g., division of an corporation) which are stored in the business unit table of the ORM database. The user can link data regarding a business unit to data regarding processes and controls by using a user interface within the process module as described in this section. Local users can input data regarding business processes (e.g., credit card origination process) that the division performs using a user interface within the process module which are stored in the business process table of the ORM database. The local user can link data regarding a process to business units, risks, and laws, regulations or other governance. Using the a user interface in the process module, local users can input data regarding risks (e.g., "The risk that unissued credit card stock is not secured") associated with a business process which are stored in the risk table of the ORM database. The user can link a risk to a process, control, or law, regulation or other governance. Local users can input data regarding controls (e.g., "Unissued credit card stock is maintained in a locked vault under dual control) using a user interface within the process module which are stored in the control table of the ORM database. The user can link a control to a risk for a specific process and business unit. These process module relationships are illustrated in FIG. 4.

A local user, such as a Compliance Officer, can translate sections of a law, regulation and other governance into specific risk statements for data input to the system. For example, the Code of Federal Regulations, Title 12, Part 226, Subpart B, Section 226.6 states, "The creditor shall disclose to the consumer, in terminology consistent with that to be used on the periodic statement, each of the following items, to the extent applicable: . . . " Not disclosing the items required by the law or regulation would expose a creditor to fines, penalties, civil litigation and other consequences. In other words, there is 'The risk that the creditor does not disclose to the consumer, in terminology consistent with that to be used on the periodic statement, . . . ' which is input by a local user using a user interface running within the process module of the ORM application within the computer system.

The compliance library is a set of data associations between risks and laws, regulations and governance. Data regarding laws, regulations and governance, along with their regulatory citation, are stored in the governance table while risk data is stored in the risk table within the ORM database of the computer system. The ORM database also stores the data linkages between a law or regulation and a set of risks. When a risk is linked to a law or regulation, it is referred to as a 'regulatory risk' and is a record within the compliance library.

Local users can use a user interface within the process module to link regulatory risks, presented for display to the user from the compliance library, to business processes, link the risks to the specific business units that participate in the given process, and link specific business units to controls deployed by the business unit to mitigate the assigned risks. When controls are absent or inadequate to fully mitigate the risk, the user can input an action plan (e.g., data regarding the control weakness and management's actions) to remediate the deficiency using a user interface within the process module of the ORM application within the computer system and link the action plan to the specific risk of process performed by a business unit.

Although not part of the compliance library, data regarding other types of risks (e.g., operational risks which are not linked to a law or regulation) and related controls can be identified, documented, and provided as data input by the local user from the process perspective as well as the business unit perspective. The process perspective is managed through the business processes an organization conducts, risks associated with the business process, business units that participate in the process and own (i.e., are associated with) the risks, and the controls deployed by the local users associated with certain business units in managing the risks. The business unit perspective is managed through a business unit, processes the business unit participates, the risks within the process owned by the business unit, and controls deployed by the business unit in managing the risk.

When using the computer system, no matter which perspective was used in defining business units, processes, risks and controls, the system may compile the data according to any one or more of the three perspectives that a user may select. As a result, the governance perspective enables an organization to demonstrate the status of compliance by producing reports for selected laws, regulations or other governance that show, legal citation by legal citation, specific provisions of the governance stated as risks, inherent risk ratings, business processes exposed to each risk, business units accountable for the risk, the controls, residual risk ratings, and any related action plans. Similarly, from the process perspective, users can examine risk and exposure related to a specific business process. Furthermore, a department manager can manage risk and exposure for his or her specific department using the business unit perspective.

The risk management functionality described may be contained within a computer system module referred to as the "process module". Even though there is significant value produced through the identification and documentation of risks and controls, it was recognized that the documented control and control assessment would only be reliable as of the date it was input into the application. In fact, over time, control breakdowns or adverse changes in performance could occur, clearly impacting risk exposure, but may not be promptly detected by management or updated in the process module. In order to enhance the effectiveness of the risk management program, the methodology also included a "control module"

The control module of the ORM application allows users to create and modify "legacy control tools" without custom-coding or special development. A legacy control tool is a collection of attributes used in a set of process steps in performing a manual review control procedure (e.g., direct visual observation of a task), such as a supervisory review of work performed. Rather than applying linear rules, a legacy control tool as described below, may be used to apply the policies, standards, business requirements and procedures to the specific fact patterns that may emerge during the review procedure.

As an example, a manual review control procedure performed by many lenders is a quality control review of closed loan files. Although there may be many areas examined during the review, one area, or attribute, of interest may be, "Was an adverse action notice provided to the consumer within 30 days of receipt of a completed credit application when the application was declined?" However, this attribute is only relevant under two conditions:

1. There was a complete credit application; and
2. The consumer was declined.

Figure 2:
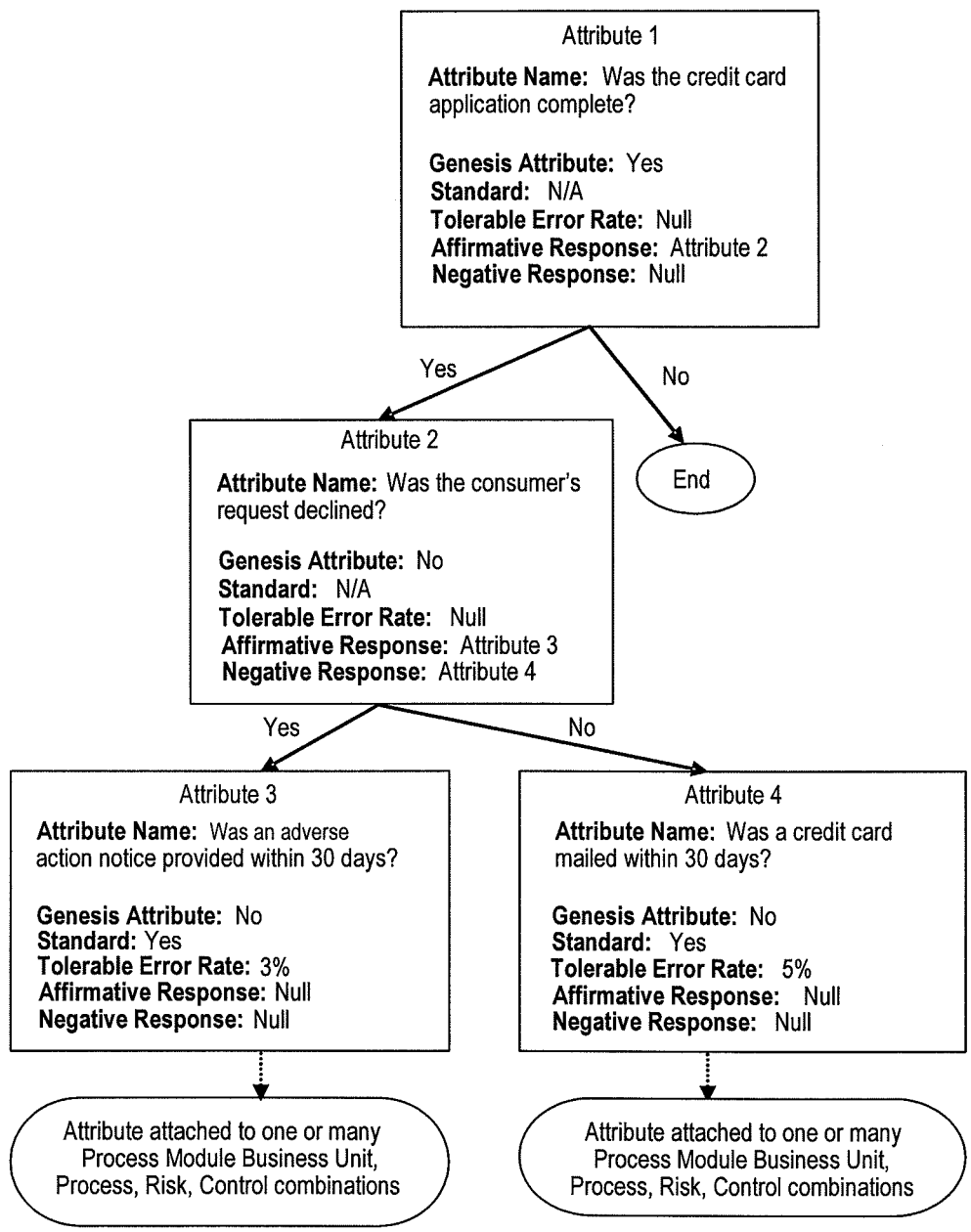
FIG. 2 shows attributes used in process steps for performing a manual review control procedure according to an embodiment.

Therefore, the attributes used in the process steps for performing the manual review control procedure (see FIG. 2) are:

Attribute 1. Was the credit application complete? If 'Yes', then Attribute 2, else Attribute XX.
Attribute 2. Was the consumer's credit request declined? If 'Yes' then Attribute 3, else Attribute XX.
Attribute 3. Was an adverse action notice provided within 30 days? If 'Yes' then stop, else 'Defect'.

The name of the legacy control tool along with the attributes used to perform the manual review control procedure are input by the local user using a user interface in the control module and stored in the legacy control tool and legacy control tool attribute tables of the ORM database in the computer system.

Using a legacy control tool, the person who performs the manual review each day may log onto the control module of the computer system to conduct his/her review as directed by the legacy control tool (See FIG. 3). The legacy control tool measures defects against opportunities and applies the actual error rate to the tolerable error rate established by the organization within the legacy control tool. Data collected from the person performing the review during the execution of the legacy control tool is stored in the legacy control execution tables of the ORM database in the computer system.

Management reporting provided as output from the computer system may reflect a current or real-time view of performance and operating effectiveness using data obtained from the manual review activity itself. Because the legacy control tool attributes that can result in a 'Defect' outcome are linked to the specific risk statement defined in the process module, management can receive current risk status reports from either a process, business unit, and governance perspective.

For example, the compliance library may include previously input data regarding the regulatory risks associated with the Equal Credit Opportunity Act (ECOA) and Regulation B. Of the many regulatory risks associated with this law and regulation, one of them is, "The risk that a creditor provides an adverse action notice within 30 days of receipt of a completed application when the application is declined." When legacy control tool attributes, like Attribute 3 (above), are linked to a regulatory risk within the ORM database, management can receive reports showing the division's compliance status with aspects of a law or regulation, including the adverse action notice requirements of the ECOA and Regulation B.

The tables and table relationships within the Legacy ORM database that support the process and control modules are shown in FIG. 4.

II. Legacy ORM Observations

Additional improvements to the computer system became desired after observing the initial use of the process and control modules of the ORM application above.

The process module was originally designed so that business units, processes, risks and controls were managed as silos by the various divisions within an organization.

For example, a business conglomerate may have three subsidiaries with each subsidiary being responsible for managing its own risks and controls. Within the computer system, each subsidiary maintained its risk management data uniquely. As a result, even when subsidiaries had like business processes (e.g., accounts payable), the same process needed to be input into the process module multiple times. Also, the same process may have been named differently across the organization. The same situation existed for business risks and controls.

Also, it was observed that business risks identified for the very same business process were sometimes inconsistent across the organization when, in most cases, the difference was not necessary. Consequently, each subsidiary or division may have been vulnerable to risks that it was not aware of and which possibly could have been avoided.

Thus, newly-learned risk management knowledge often could not be readily shared across the organization. At an organizational level, consistent risk management across the organization was often difficult and organizational level reporting was not available.

The control module of the ORM application had some limitations that sometimes constrained its effectiveness. First, the legacy control tool was limited to only manual review activities. Even then, although a legacy control tool could guide the manual review process, the control activity was still dependent upon manual operation by a person. In addition, the legacy control tool was not capable of performing any of the process steps.

Furthermore, defect rates determined during control execution were not used in assessing residual risk. Consequently, the ORM application could not measure risk exposure and risk direction. In addition, the ORM application was unable to aggregate attribute results across a division or organization.

Based on the above observations, improved methods for performing controls and managing risk were developed.

III. Next Generation Application

Figure 4A:
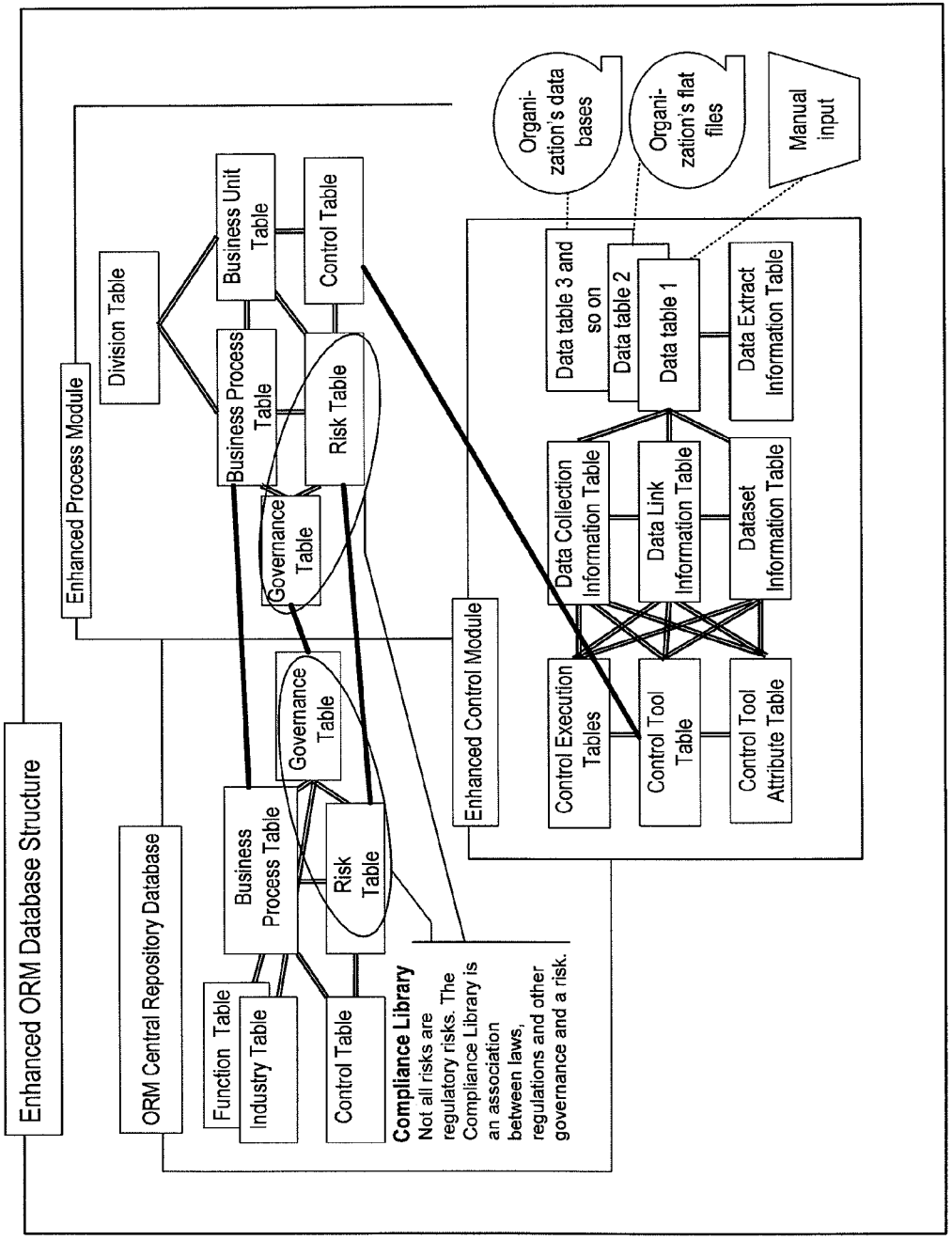
FIG. 4A shows a database structure to performing control processes and manage risk within an organization according to an embodiment.

A new improved method is now described below to perform control processes and manage risk more efficiently and effectively within an organization (and in some cases, for example, across an industry including several organizations). The new method may be implemented through the use of the enhanced ORM database structure now described below and illustrated with reference to FIG. 4A.

The ORM database structure integrates an enhanced process module, enhanced control module and optionally a new ORM central repository. Within the new database structure, the business process table on the ORM central repository database of the organization that hosts the repository has a data table relationship with the business process table of the ORM database that resides at the local user's organization. Similar relationships between the ORM central repository database and the ORM database exist for the governance and risk tables. The control table of the enhanced process module has a data table relationship with the control tool table of the enhanced control module within the ORM database.

One function of the new method is to collect and exchange data regarding practical risk management experience and knowledge across an organization (or across an industry as mentioned above). Based upon the enhanced ORM application and ORM database structure, process, risk, control and governance data input by a user in one division of an organization can be, for example, immediately applied by local users in other divisions of an organization, and even by local users in other organizations, using, for example, check boxes to accept the data for use in managing risk in their own division or business unit. In addition, the application and database structure organizes and filters the data such that, when information is shared, it is relevant to the person receiving the information (e.g., the compliance officer receives information only involving compliance, a unit manager receives only information that might affect the manager's business unit, and a controller receives only information that might affect a financial process).

Another function of the new method is to improve the way by which controls are performed within an organization. Using a tool within the ORM application, users construct automated controls that access data sources and perform the operations necessary to conduct a complete control procedure in one or sometimes all areas of the business. After execution of the control procedure by the computer system, the computer system organizes and reports the data in relation to each intended local user audience. For example, while the computer system reports all identified errors and irregularities and related trends involving a specific business unit to a local user who is, for example, the unit manager, only those errors and irregularities that involve a financial process are reported to the local user who acts as the controller for the organization.

The new method and ORM database structure and enhanced ORM application are described in more detail below. Additional information regarding risk management methodology that may, for example, be applied by the computer system is presented in the Appendix A to this document, which is hereby incorporated by reference in its entirety.

IV. Process Module Advancements

A new method is described below to improve the use of risk management knowledge in an organization using an enhanced process module (see FIG. 5). The method is implemented using new software modules that may be, for example, executed on the computer system described above. The method involves a local user accessing, for example, a web server as was described for the computer system above.

Within the enhanced process module, the risk management relationship may be extended to divisions within an organization. Using a web-based interface within the enhanced process module, local users input the various divisions of an organization, which is stored in the division table of the ORM database. The local user can also access the web-based interface to link a division to a business process or business unit based upon the table relationships shown in FIG. 5, as is described in more detail below.

Sharing Institutional Process Knowledge

As was discussed above, prior users accessing the computer system have previously input data regarding processes used in various divisions within an organization, which process data is stored in the business process table also discussed above. In this new method, the local user is presented by the web server in a user interface with a subset of business processes that have been input by other local users within the organization (e.g. local users in other divisions of the organization), but have not yet been linked to the local user's division. The local user may select one or more of the presented processes for linking to information in a database that has been previously associated with the division associated with that local user (e.g., that local user's division as previously configured in the computer system). The local user may, for example, become aware of such processes that are available for linking by receipt of an alert email sent to the local user by the computer system and also whenever the system is accessed to create a new process.

In one embodiment of the method, all or a portion of the other users of the computer system may receive an email alert that a new process(es) has been added to the ORM database. Each local user can set preferences in the computer system to receive a notification (1) whenever an addition is made by any other division within the organization, (2) select only certain divisions from the list of divisions within the organization, or (3) no notification. The notification may include, for example, the originating division name, process description and any other data about the process that the local user input when the new process was input.

Sharing Institutional Risk Knowledge

As was discussed above, prior users accessing the computer system have previously input data regarding risks associated with various business processes within an organization, which risk data is stored in the risk table also discussed above. Without the ORM database structure and application described previously, a user would likely search through many risks to find the few that may apply to the user's division. In this new method, the local user is presented by the web server in a user interface with a subset of risks, including regulatory risks which are risks that have been linked to a law or regulation, that have been created by users in other divisions within the organization for a process that is also used by the local user's division, but have not yet been applied to the local user's division. In this case, the computer system has eliminated inapplicable risks from the list because of the ORM database structure relationship between a business process and a risk. The local user may select one or more of the presented risks for linking to the business process for the division associated with that local user. The local user may become aware of such risks that are available for linking by receipt of an alert email sent to the local user by the computer system and whenever the system is accessed to create a new risk.

In one embodiment of the method, all or a portion of the other users of the computer system may receive an email alert that a new risk(s) has been added to the database for a business process that is also linked to the recipient user's division. The notification includes the originating division name, process name, risk statement, risk category, and any other data about the risk that the local user input when the new risk was created.

Sharing Institutional Control Knowledge

As was discussed above, prior users accessing the computer system have previously input data regarding controls used to mitigate various risks of processes within an organization, which control data is stored in the control table also discussed above. Without the ORM database structure and application described previously, a user would likely search through many controls to find the few that may be applied to mitigate the specific risk. In this method, the local user is presented by the web server in a user interface with a subset of controls that have been created by users in other divisions within the organization for a risk of a process that is also used by the local user's division, but have not yet been linked to the local user's division. In this case, the computer system has eliminated inapplicable controls from the list because of the ORM database structure relationship. The local user may select one or more of the presented controls for linking to the risk and business process for the division associated with that local user. The local user may become aware of such controls that are available for linking by receipt of an alert email sent to the local user by the computer system and whenever the system is accessed to create a new control.

In one embodiment of the method, all or a portion of the other users of the computer system may receive an email alert that a new control(s) has been added to the database for a risk of a business process that is also linked to the recipient user's division. The notification includes the originating division name, process name, risk statement, control name, and any other data about the control that the local user input when the new control was created.

It should be noted that the notifications and alerts described above also may be combined into a single integrated notification or alert.

Sharing Institutional Compliance Library Knowledge

As was discussed above, prior users accessing the computer system have previously linked data regarding laws and regulations to data regarding certain business processes, which are stored as a table relationship between the governance and business process tables also discussed above. Without the ORM database structure and application described previously, a user would likely search through many processes to find the few that may apply to a law, regulation or other governance. In this method, the local user is presented by the web server in a user interface with a subset of processes that have been linked by users in other divisions to a law or regulation where the process is also used by the local user's division, but the process has not yet been applied to the law or regulation within the local user's division. In this case, the computer system has eliminated inapplicable processes from the list because of the ORM database structure relationship between a business process and governance. The local user may select one or more of the presented processes for linking to the law or regulation for the division associated with that local user. The local user may become aware of such processes that are available for linking by receipt of an alert email sent to the local user by the computer system and whenever the system is accessed to link a law or regulation to a business process.

In one embodiment of the method, all or a portion of the other users of the computer system may receive an email alert that a process(es) has been linked to a law or regulation where the process is also used by the local user's division, but the process has not been linked to the law or regulation within the local user's division. The notification includes the division name, process name, and law or regulation.

In addition, a new method is described below that allows local users to create new risk management data relationships.

The method may be implemented using new software modules executed on the computer system described above. The method involves a local user accessing the web server described in the computer system above.

As was discussed above, the computer system manages relationships between processes, risks, controls, and compliance library which are stored as tables and table relationships in the ORM database. In one embodiment of this method, the local user may further be presented by the web server in a user interface with an option to establish and store additional risk relationships within the ORM database using a new category table. The new category table has data relationships similar to the process table, except that, instead of managing relationships with a business process, the new data relationship manages divisions, business units, risks, controls, governance, and compliance library relationships with the new category (see FIG. 10). The new risk relationship is functional in a way that is similar to the operations that are available in and described above with respect to the process module.

V. Control Module Advancements

Another new improved method is now here described for performing complex control processes in an organization by building and executing an enhanced control tool, which is an improvement to the legacy control tool that was briefly described above. The method is implemented using new software modules, which may, for example, be executed on the computer system described above. One of these modules is a control module, which has the function of performing control procedures and processes. Local users access the computer system described above through, for example, a web user interface or other user device. The enhanced control tool is described in more detail below and also illustrated with reference to FIG. 7.

Figure 6A:
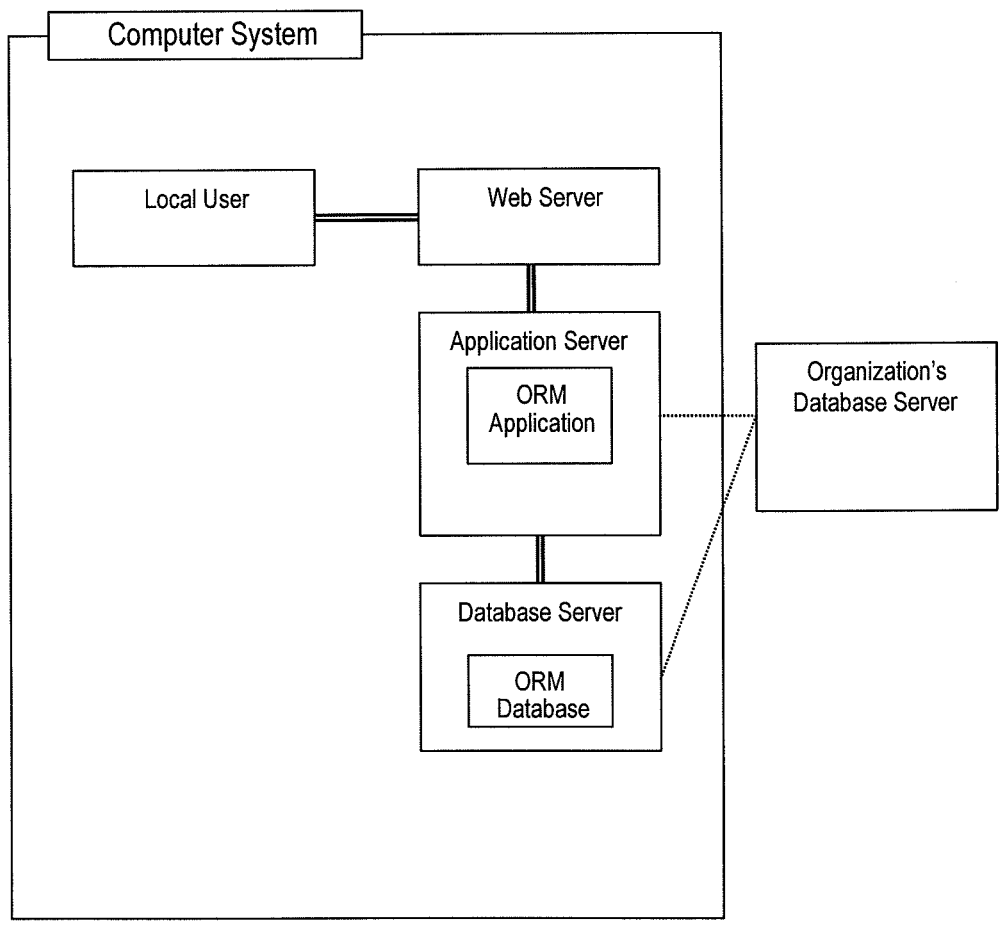
FIG. 6A shows a relationship between an organization's database server and an application server and database server of a computer system according to an embodiment.

In this method, source data contained in one or, more typically, numerous databases of the organization is retrieved by the computer system for use in an enhanced control tool. A diagram of the relationship between an organization's database server and the application server and database server of the computer system is shown in FIG. 6A.

These data sources contain the data elements (e.g. 'date of birth') necessary to perform a control procedure. A control procedure is a collection of process steps for performing a control activity (e.g., reviews, validations, certifications, audits, and reconciliations). Using a web-based user interface within the control module, the local user inputs the location of the databases, applicable tables within the databases that contain the source data, and credentials necessary for the computer system to access the organization's databases. The computer system stores the input data in the ORM database within the computer system.

In one embodiment of the method, the local user inputs the location of source data contained in data files and flat files using a web-based user interface within the control module of the ORM application within the computer system. The computer system stores the input data in the ORM database. The computer system creates new data tables in the ORM database and copies the file data into the data tables of the ORM database within the computer system.

In an embodiment of the method, the local user inputs dataset information using a web-based user interface in the control module of the ORM application, which is stored in the dataset information table within the ORM database. The dataset information table contains the dataset elements used by the computer system to determine the population of records that will be evaluated during execution of the enhanced control tool.

Figure 15:
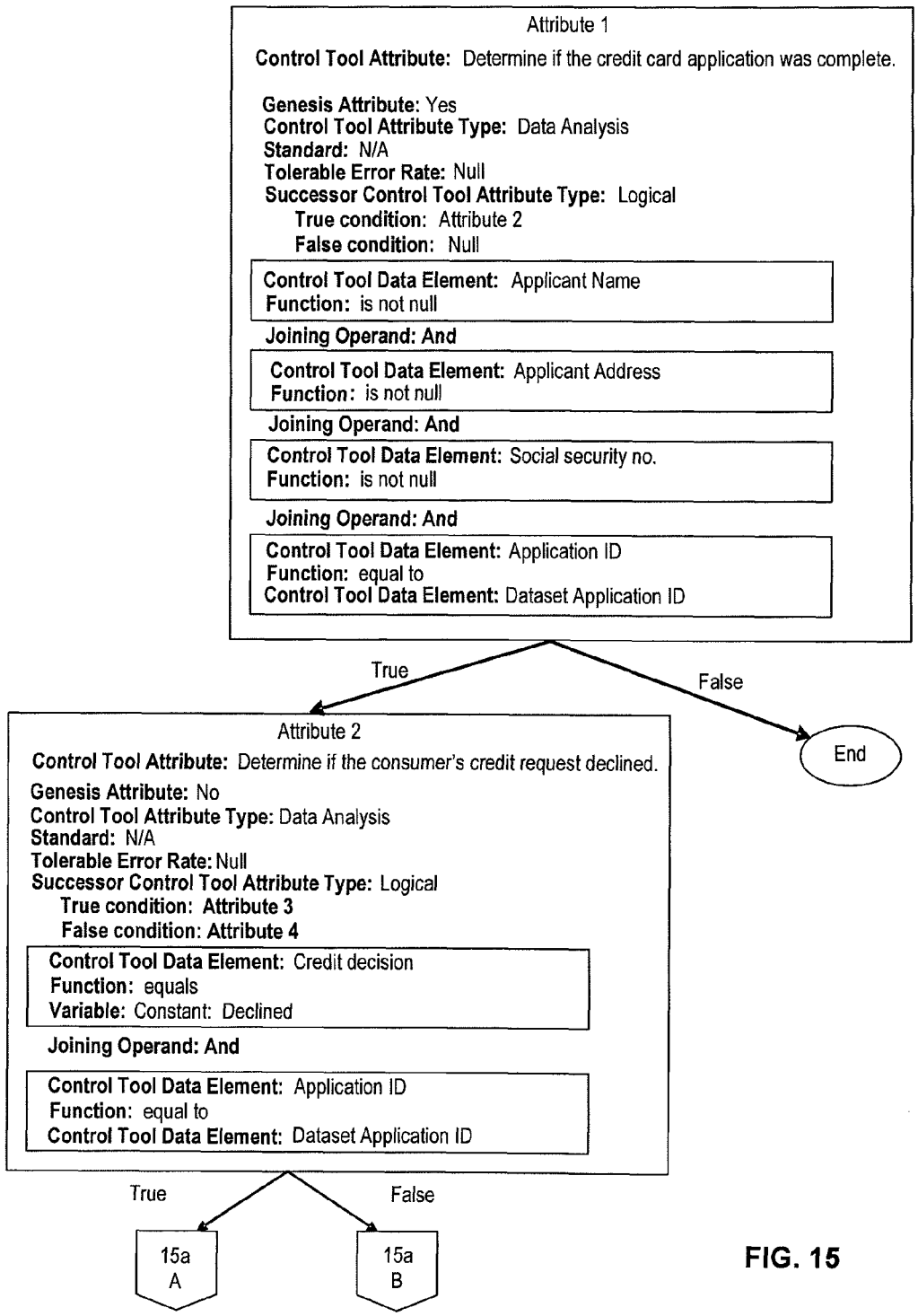
FIGS. 15 and 15A show a sample selection from a control tool design according to an embodiment.
Figure 15A:
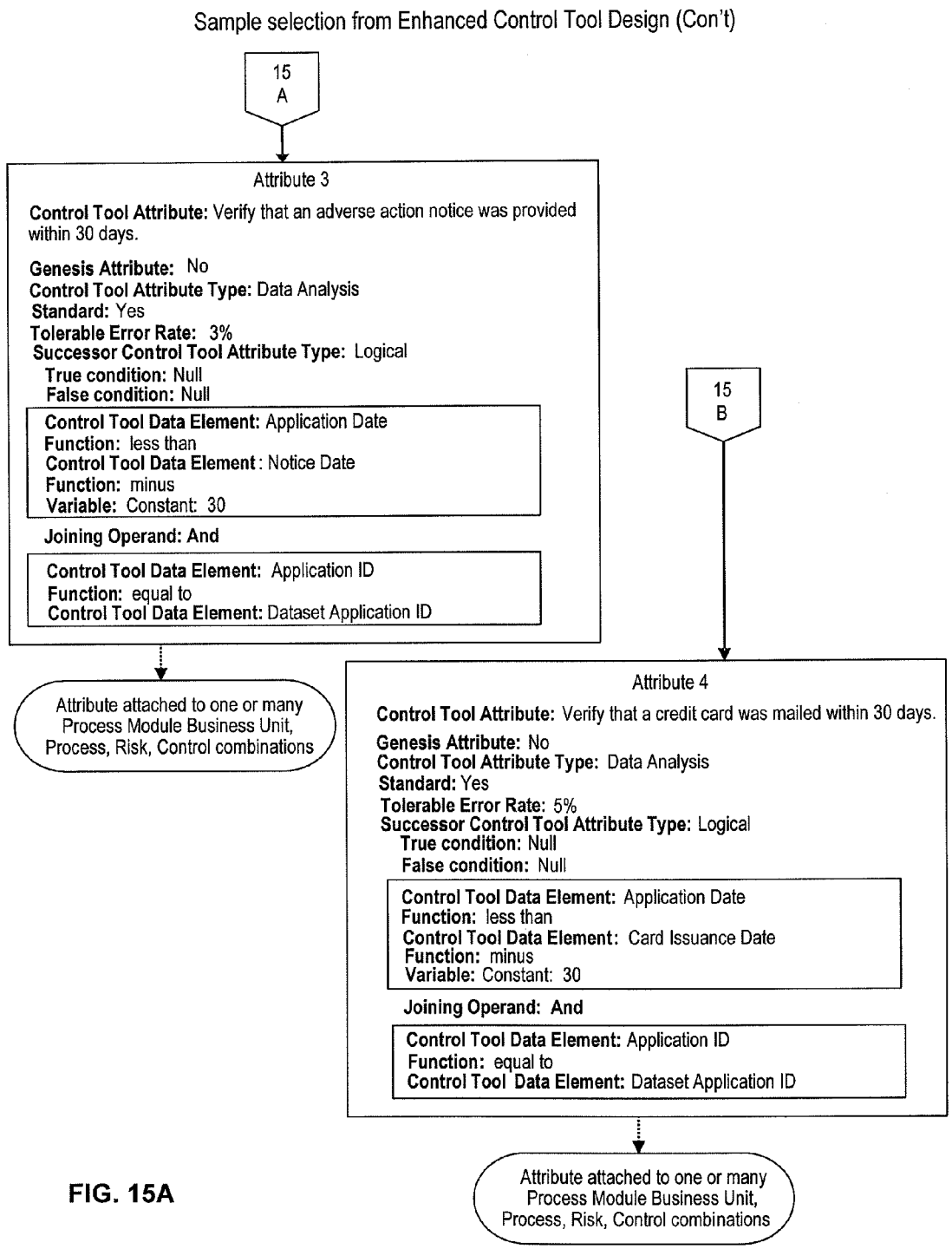

In another embodiment of the method, the local user accesses the computer system to create an enhanced control tool through the web server in a user interface within the control module. Although the definition of legacy control tool was limited to process steps in performing a manual review procedure, the enhanced control tool is a collection of attributes used in performing the control procedure for any manual or automated control activity. Each of these attributes is a process step, which has a data structure and associated data (e.g., input by a local user) as described further below (an exemplary enhanced control tool is discussed further below with respect to FIG. 15). The enhanced control tool is named and specifications for its use are input by the local user and stored in the control tool table within the ORM database.

The computer system prompts the user to create the attributes that comprise the control procedure within the enhanced control tool. The local user names the control tool attribute and the computer system presents the user with a subset of data elements, datasets and other criteria, as described further below, that can be used to define how the control tool attribute is to be performed by the computer system during enhanced control tool execution (see FIG. 15). The computer system collects and stores the control tool attribute data in the control tool attribute table within the ORM database. The computer system continues to prompt the user for the creation additional control tool attributes until the control procedure is fully defined in the enhanced control tool.

For each attribute, the computer system presents the user with a subset of possible successor control tool attributes, as described further below. A successor control tool attribute is the attribute that the computer system will perform next in the control procedure within the enhanced control tool. The user selects the successor control tool attribute(s) for each attribute and sets the tolerable error rate for each attribute that could result in a 'defect' outcome. After the local user creates the enhanced control tool, the local user, or another local user of the computer system, may create additional control tools in a similar manner.

Another embodiment of the method, the local user schedules the timing and frequency by which the enhanced control tool is to be executed. The computer system collects and stores the schedule in the control tool table within the ORM database.

In another embodiment of the method, at the scheduled time, the computer system initiates the execution of the enhanced control tool. The computer system collects the data from the predetermined data sources and performs each control tool attribute following the control procedure defined in the enhanced control tool. Attribute results collected during the performance of the enhanced control tool are stored in the control execution table within the ORM database.

In another embodiment of the method, once the enhanced control tool is executed, one or more alerts are output from the computer system when the defects exceed tolerance thresholds established in the enhanced control tool.

In another embodiment of this method, the control module interfaces with the process module of the ORM application to modify the risk direction and residual risk ratings in the ORM database based upon attribute results collected during control tool execution.

In another embodiment of this method, the enhanced control tool uses and applies data obtained from electronic data sources (e.g., sources controlled by the organization and/or by third parties) in combination with data obtained from physical observation or some other manual input, or data obtained entirely from manual input.

In subsequent description and use of the term "enhanced control tool" in the remaining sections and figures below, it shall be referred to simply as a "control tool", with it being understood that the new enhanced control tool is being described.

VI. Central Repository

Figure 8:
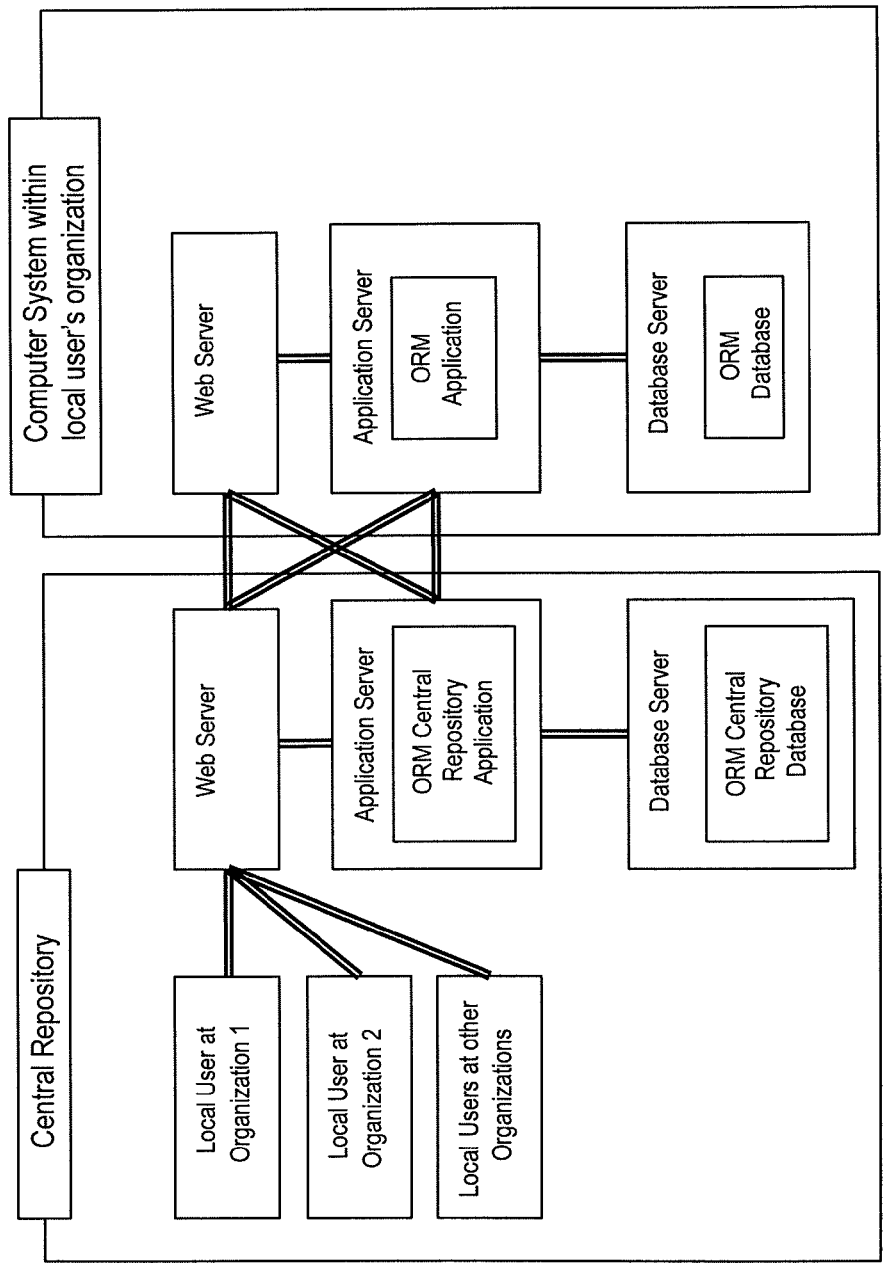
FIG. 8 shows a central repository that communicates with a web server according to an embodiment.

Another new method uses a central repository that can communicate with the web server discussed above (see FIG. 8). The central repository is typically operated by a different organization than the organization hosting the computer system hosting the local users described above, and typically, for example, provides user access to a large number of users at many different organizations. The central repository is a database having a collection of data regarding business processes, risks, controls, governance, and compliance library relationships similarly as described in the process module discussed with reference to FIG. 4A above. The collection may be organized by industry (e.g., financial services, manufacturing, and medical) and/or by function (e.g., accounting, operations) with other categories added as necessary to support the local users and users at other organizations. The categories are, for example, set up in the system by a programmer adding additional fields or data tables. The central repository may also contain a compliance library, which is similar to the compliance library maintained in the ORM database within the computer system in the local user's organization that was described above (see illustration of the central repository table relationships in FIG. 9).

In this new method, prior users (e.g., local users and/or other users in other organizations) accessing the central repository have previously input data regarding business processes used in various industries and/or functions, which process data is stored in a business process table similarly as described above (e.g., this process table may be stored in the ORM central repository database of the organization that is hosting the central repository). A local user is presented in a user interface by the web server of the organization hosting the central repository with a subset of processes (e.g. processes within an industry) based upon preferences set by the local user. When the local user's organization operates the computer system described above, the local user may select one or more of the presented processes in the central repository. The web server for the central repository may immediately communicate with the web server of the local user and transfers the user name, process name and description to the process module and linking the process to the division associated with the user (e.g., that local user's division as previously configured in the computer system described above) in the ORM database of the local user's organization. When the local user's organization does not operate the computer system described above, the local user can generate a report of the selected processes and copy the information to the user's desktop application (e.g., Microsoft Excel, Word).

In one embodiment of the method, all or a portion of the local users and other users at other organizations of the central repository may receive an email alert when a new process(es) has been added to the ORM central repository database. The local user can set preferences in the central repository to receive a notification whenever a new process is created within the user's industry and/or function. The notification includes the industry and/or function, the process name, process description and any other data about the process that the local user input when the new process was created.

In another embodiment of the method, local users having access to the central repository are able to upload new processes to the central repository. Based upon preferences set in the computer system operated by the organization described above, the web server of the computer system communicates with the web server of the central repository and transfers the process name and description to the central repository for the division's industry when a new process is created in the process module described above. Any local user, whether or not the central repository web server interfaces with the organization's web server, can input a new process in the repository using the user interface within the central repository. The central repository stores the data in the business process table of the repository for use by other users.

In additional embodiments of the method, industry, function, risk, control, governance and compliance library data is exchanged between local users of various organizations in a manner similar to the method described above for business processes.

VII. Process Module Design

The new method used to improve the use of risk management knowledge in an organization is now described in more detail below for a specific embodiment.

1. Sharing Institutional Process Knowledge

From the user interface in the web server, the local user selects the 'Add new process' function (not shown) which opens a new page of the user interface within the process module of the computer system. The new page is shown in FIG. 11. As discussed above, the computer system presents the user with a subset of processes that have been created by users in other divisions within the organization, but have not been applied to the local user's division. The local user may select one or more of the presented business processes from the list (see FIG. 11).

Figure 5:
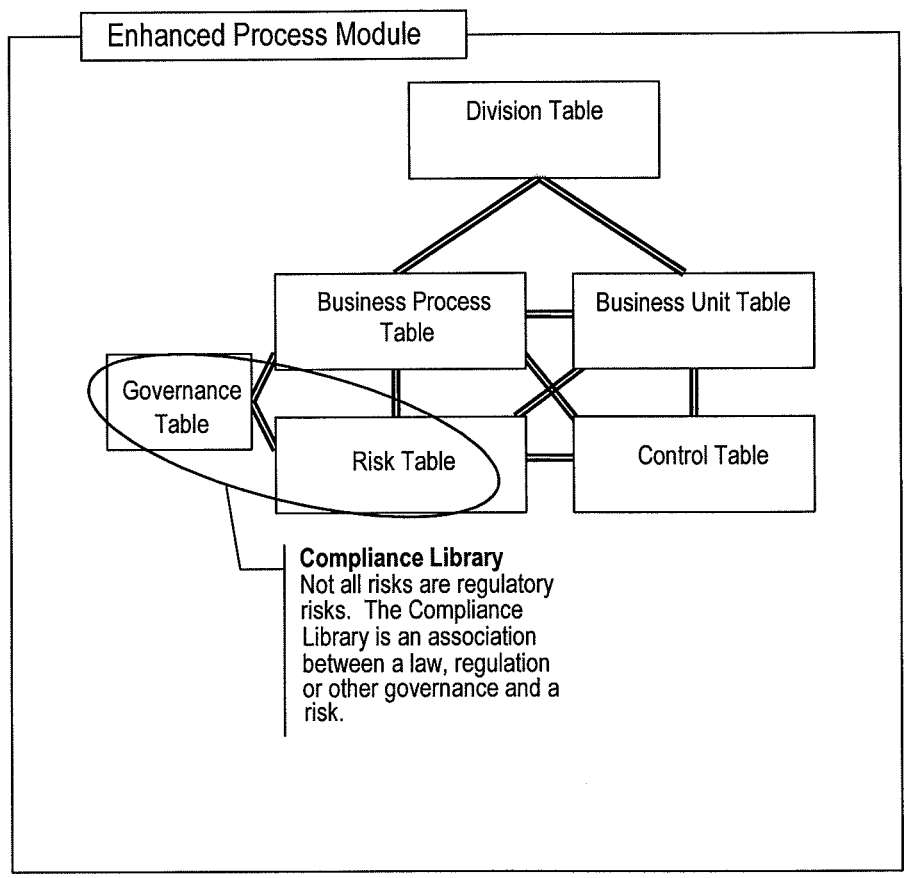
FIG. 5 shows an enhanced process module according to an embodiment.

When the local user selects a process(es) from the list, the computer system links the process to the division associated with that local user to establish a relationship between the division and the business process table (see FIG. 5 referenced above). If the user elects to create a new business process that is not on the listing, the user can select the 'Add new process' function from the user interface within the process module (see FIG. 11). The user inputs the process name, process description and other process data in the user interface. Upon saving the process, the computer system stores the data in the process table discussed above.

When a new process is created by a local user, the computer system sends an email alert to all or a portion of the system users of other divisions within the organization based upon user preferences set in the computer system. Using a web-based interface in the process module of the computer system, the local user can set preferences in the computer system to receive a notification (1) whenever an addition is made by any other division within the organization, (2) select only certain divisions from the list of divisions within the organization, or (3) no notification (see FIG. 12) which is stored in the user table of the ORM database. The notification includes the originating division name, process description and any other data about the process that the local user input when the new process was created. If the email recipient decides that the new process is relevant to the recipient user's division, the user can link the process to the user's division by taking one or more actions through a user interface as described in this section.

2. Sharing Institutional Risk Knowledge

From the user interface in the web server, the local user selects a business process from a subset of processes linked to the user's division presented by the computer system within the process module, and, then, selects the 'Add new risk' function for the selected process (not shown) which opens a new page of the user interface within the process module of the computer system. The new page is shown in FIG. 13. As discussed above, the computer system presents the user with a subset of risks applicable to that business process, including regulatory risks, used in other divisions within the organization that are not yet applied to the user's division. The user can select one or many risks from the listing (see FIG. 13).

When the local user selects a risk(s) from the list, the computer system links the risk to the process of the division associated with that local user to establish a relationship between the division, business process, and risk tables (refer to FIG. 5 referenced above). If the user elects to create a new risk that is not on the listing, the user can select the 'Add new risk' function from the user interface (See FIG. 13). The user inputs the risk statement, risk description and other risk data in the user interface. Upon saving the risk, the computer system stores the data in the risk table of the ORM database discussed above.

If the new risk is a regulatory risk, the user can link the risk to a law, regulation or other governance using the user interface within the process module in which the computer system presents a listing of the laws and regulations. The user can select the specific law, regulation or other governance to which the risk applies and the computer system links the risk to the law or regulation to establish a relationship between the governance table and risk table (refer to FIG. 5 referenced above).

When a new risk is created by a local user, the computer system sends an email alert to all or a portion of the system users of other divisions within the organization where the process is also used by the other division based upon user preferences set in the computer system as described above. The notification includes the originating division name, process name, risk statement, risk category, and any other data about the risk that the local user input when the new risk was created. If the email recipient finds the new risk relevant to the recipient user's division, the user can link the risk to the user's division as described in this section.

3. Sharing Institutional Control Knowledge

From the user interface in the web server, the local user selects a business unit from the subset of business units linked to the user's division presented by the computer system within the process module, selects a process from the subset of processes that are linked to the selected business unit, selects a risk from the subset of risks linked to the selected process for the selected business unit, and, then, selects the 'Add Control' function for the selected risk (not shown) which opens a new page of the user interface within the process module of the computer system. The new page is shown in FIG. 14. As discussed above, the computer system presents a subset of controls that have been created by users in other divisions within the organization for a risk of a process that is also used by the local user's division, but have not been linked to the local user's division. The local user may select one or more of the presented controls for linking to the risk and business process for the division associated with that local user (see FIG. 14).

When the local user selects a control(s) from the list, the computer system links the control to the risk associated with the process that is associated with the business unit of the division associated with that local user to establish a relationship between the division, business process, risk and control tables (see to FIG. 5 referenced above). If the user elects to create a new control that is not on the listing, the user can select the 'Add new control' function from the user interface (see FIG. 14). The user inputs the control, control description, and other control data in the user interface. Upon saving the risk, the computer system stores the data in the control table of the ORM database discussed above.

When a new control is created by a local user, the computer system sends an email alert to all or a portion of the system users of other divisions within the organization where the risk and process are also used by the other division based upon user preferences set in the computer system as described above. The notification includes the originating division name, process name, risk statement, control name, and any other data about the control that the local user input when the new control was created. If the email recipient finds the new control relevant to the recipient user's division, the user can link the control to the user's division as described in this section.

4. Sharing Institutional Compliance Library Knowledge

From the user interface in the web server, the local user selects a law or regulation from the list of laws, regulations and governance presented by the computer system within the process module, and, then, selects the 'Link Process(es)' function (not shown) for the selected law or regulation which opens a new page of the user interface within the process module of the computer system. The new page is shown in FIG. 25. As discussed above, the computer system presents a subset of processes that have been linked by users in other divisions to the selected law or regulation where the process is also used by the local user's division, but the process has not been linked to the law or regulation within the local user's division. The local user may select one or more of the presented processes for linking to the law or regulation for the division associated with that local user (see FIG. 25).

When the local user selects a process(es) from the list, the computer system links the process to the law or regulation that is associated with the division associated with that local user to establish a relationship between the division, business process, and governance tables (see to FIG. 5 referenced above). If the user elects to link a process that is not on the listing, the user can select a process from the subset of processes presented by the computer system that are used by the local user's division, but not linked to the selected law or regulation. The local user may select one or more of the presented processes for linking to the law or regulation for the division associated with that local user (see FIG. 25). Upon selecting a process from the list, the computer system links the process to the law or regulation as described above.

When a new relationship has been established between a process and a law, regulation or other governance, the computer system sends an email alert to all or a portion of the system users of other divisions within the organization where the process is also used by the other division based upon user preferences set in the computer system as described above. The notification includes the division name, process name, and law or regulation. If the email recipient finds the new relationship relevant to the recipient user's division, the user can link the process to the law, regulation or other governance as described in this section.

As described above, the method involves the sharing of process, risk, control, and governance data across many divisions within an organization. Variations of the method may be applied to the different types of information that is collected and shared. For example, additional data tables, like an action plan table, which also may be linked to business units, processes, risks and controls, can be added to the relationship such that, when a new action plan is created in one division, the issue and remediation actions can be shared across the organization in a manner similar to a new process or risk. At a field level, additional fields may be added to any data table, and although the content of the data table may differ, the method by which the content is communicated across the organization is unchanged.

As was discussed above, the computer system manages relationships between business units, processes, risks, controls, and compliance library which are stored as tables and table relationships in the ORM database. The local user has the option of establishing and storing additional risk relationships within the ORM database using a new category table. A new category table contains information about a specific area of the business that the business wants to manage from a risk perspective (e.g., business processes).

Figure 10:
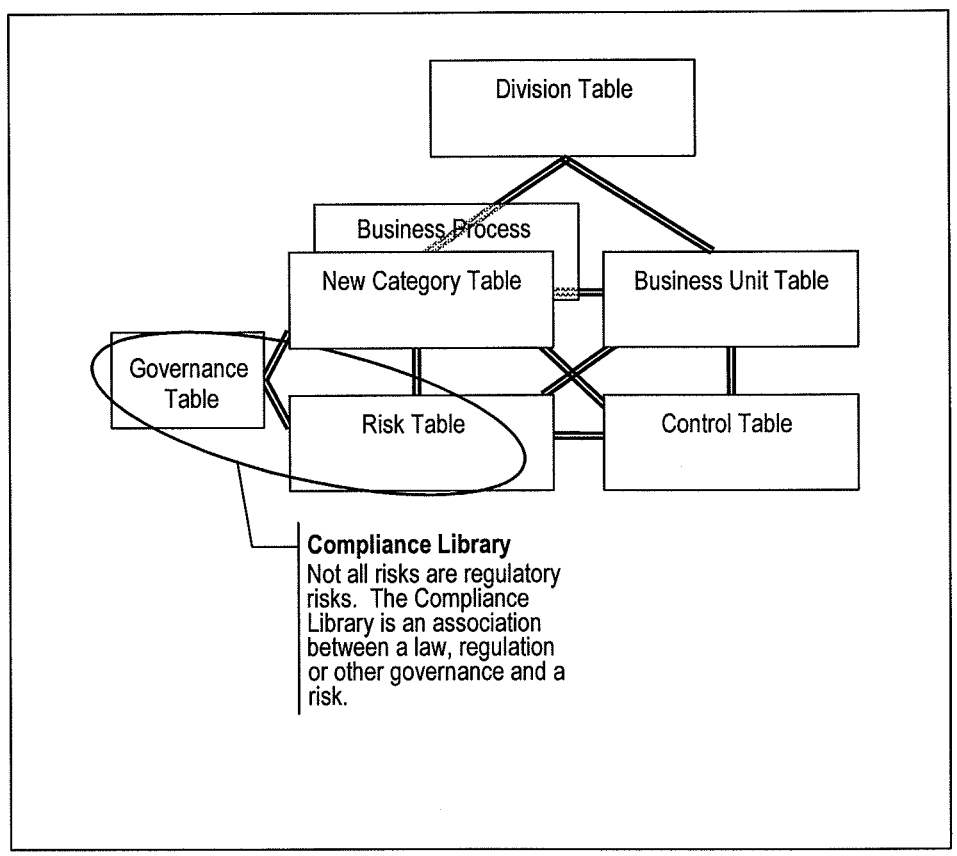
FIG. 10 shows table relationships according to an embodiment.

The risk management relationship described in the preceding paragraph for business processes is equally relevant to other business areas (e.g. projects, vendors, systems). For example, vendors used by an organization can expose the business to risk. Similar to business processes, there is a linkage between individual vendors and risks. Some of the risks can be regulatory risks signifying a linkage between a vendor and laws, regulations and other governance. Individual vendors are managed by relationship managers within the business units establishing another data linkage that may be stored in the new category table. A local user in the business unit may apply controls to mitigate the risks associated with a vendor resulting in an additional data linkage that may be stored. As a result, the same method applied to manage risks associated with business process can also be applied to other categories, such as projects. An illustration of these table relationships is shown in FIG. 10.

Local users can add a new category table by selecting the 'Add new category' function (not shown) from the user interface in the web server of the computer system. The computer system prompts the local user to name the new category (e.g. project, vendor or other category for managing the risk relationship). After naming the new category, the computer system creates a new category table using the category name input by the local user and the existing table structure of the process table within the ORM database. Without disrupting the existing relationships with the process table, the computer system may link the division, business unit, risk, control, and governance tables to the new category table within the ORM database. Then, this new risk relationship is functional in a way that is similar to the operations that are available in and described above with respect to the process module.

VIII. Control Module Design

Figure 7:
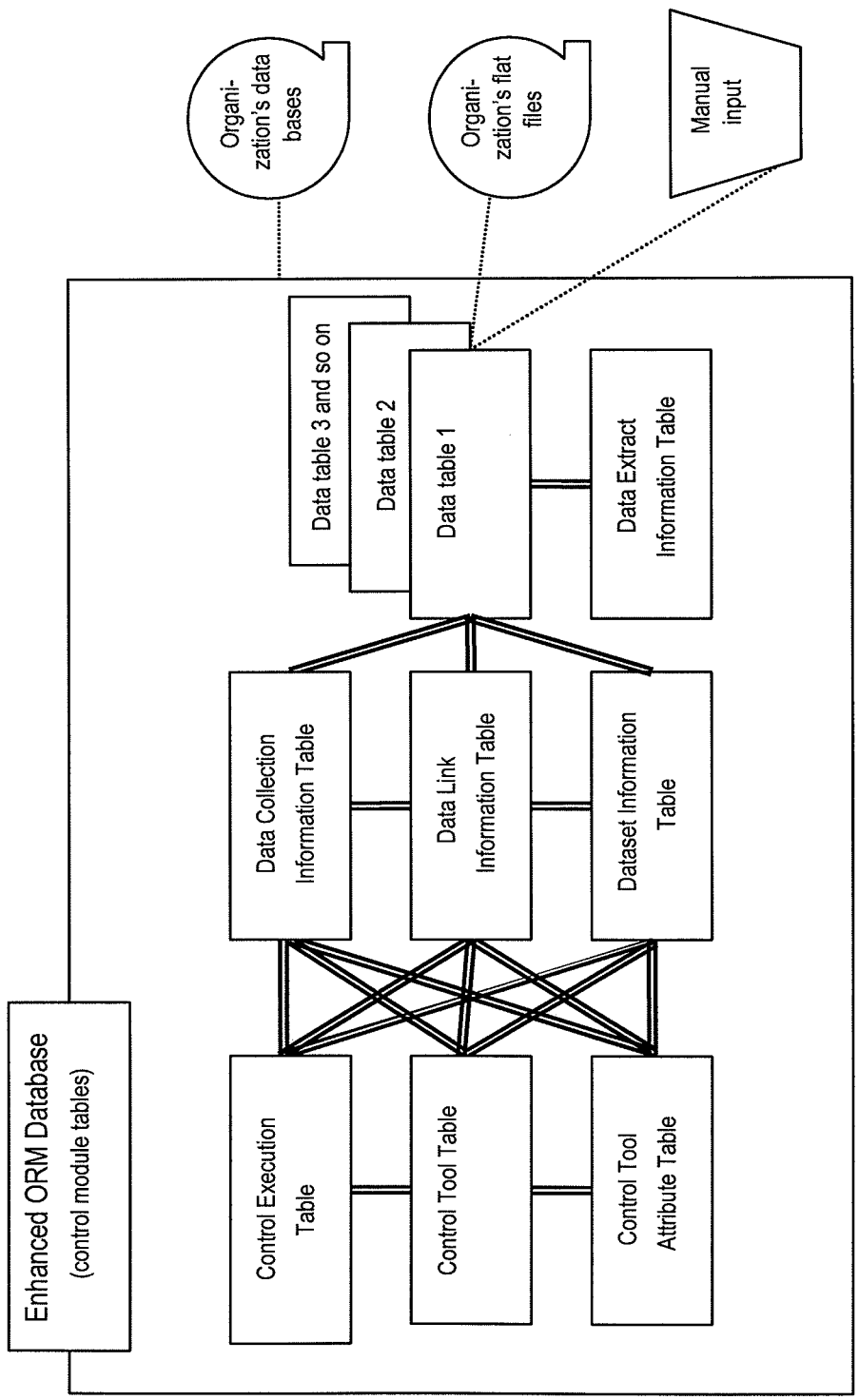
FIG. 7 shows an enhanced database with control module tables according to an embodiment.

The new improved method mentioned above for performing complex control processes (e.g., reviews, validations, certifications, audits, and reconciliations) in an organization by building and executing an enhanced control tool is now described in more detail (see illustration of the control module tables within the ORM database in FIG. 7). The embodiment presented below is one example of a working system. Variations are possible in other embodiments.

1. Source Data Contained in Databases

As described briefly above, source data contained in databases (e.g., MS Access, Oracle, My SQL, SQL Server, DB2) of the organization is retrieved by the computer system for use in one or more control tools. These data sources contain the data necessary to perform a fully automated control procedure in a control tool.

For example, a control tool for bank account reconciliations requires two data sources: 1) bank statement and 2) check register. In addition, each data source, such as a bank statement, contains data elements like the transaction date, amount, and payee. In order for the computer system to perform a control procedure, such as a bank account reconciliation, it needs access to the data elements necessary to perform the control procedure in the applicable control tool.

Using the user interface of the computer system, a local user performs the following operations to link an organization's databases and data files to the computer system:
1) Selecting and linking an organization's database to the computer system; and,
2) Selecting and linking specific data tables within the organization's database to the computer system.

Figure 16:
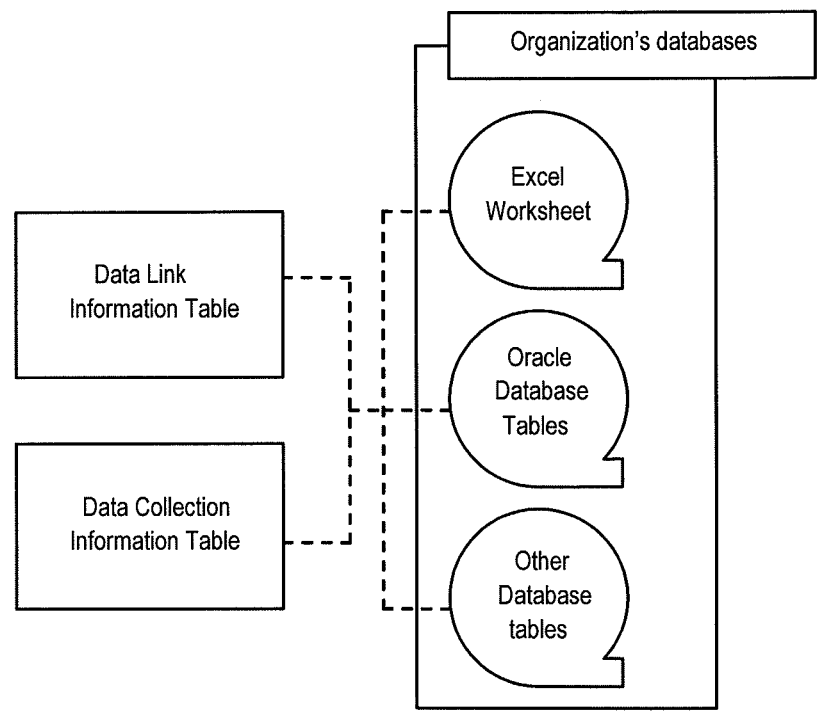
FIG. 16 shows source data contained in databases according to an embodiment.

A diagram of the relationship between databases within the organization and the data link information and data collection information tables of the ORM database described below is shown in FIG. 16.

A. Selecting and Linking an Organization's Database to the Computer System

In a user interface within the control module of the ORM application in the computer system, the local user inputs the required fields as referenced in FIG. 17. The data link name is an alphanumeric field defined by the user to name the database connection. The user selects the organization's source database (e.g., Oracle). The server and port fields identify the specific location of the organization's database. The credentials field is the password used by the computer system to access the organization's database.

After the local user saves the input, the computer system validates that no field is null and tests the connectivity of the organization's database to the computer system. If the connection fails the computer system's test procedure, the user receives a failure message; otherwise, the input data is stored in the data link information table in the ORM database of the computer system.

B. Selecting and Linking Data Tables within an Organization's Database to the Computer System In a user interface within the control module of the ORM application in the computer system, the computer system presents the local user with a list of the data links input as described above. The user selects a data link from the list and selects the 'Create Data Collection' function (not shown).

The local user inputs the required fields as referenced in FIG. 18 using the user interface in control module of the computer system. The data collection is an alphanumeric field defined by the user to name the collection of data tables. The computer system presents the data tables for the organization's database associated with the data link. The user selects one or more of the data tables from the list.

After the local user saves the input, the computer system stores the input data in the data collection information table in the ORM database of the computer system.

2. Source Data Contained in Data Files

As described briefly above, source data can also be contained in data files and flat files of the organization (e.g., XML File or Microsoft Excel worksheet) which can also be retrieved by the computer system for use in a control tool. The source data is imported by the computer system based upon information input by the local user in a web-based user interface. The computer system creates new data tables in the ORM database and copies the organization's data into the data tables. A diagram of the relationship between an organization's data files and flat files and the data link information table, data extract information table, and data table of the ORM database described below is shown in FIG. 20.

In a user interface within the control module of the computer system, the local user inputs the required fields as referenced in FIG. 21. The data file name is an alphanumeric field defined by the user to name the data file extract. The local user selects the organization's source data file from the list of file types presented by the computer system (e.g., Excel worksheet). The source location is the specific location of the data file on the user's local drive or network server. In other embodiments, the source location may be, for example, an Internet address of another location. The user selects the option to either append or truncate which determines how existing data in the data table will be managed when new data files are loaded. If append is selected, the computer system will retain existing data in the data table and add new data from the data file to the data table. If truncate is selected, the computer system will delete existing data in the data table before adding new data from the data file. The user selects the option of locking or unlocking the data loading process of the ORM application. When unlocked, the data loading process will not be performed and no new source data is loaded to the data table. The user can also select the frequency by which data is loaded from the organization's data files and stored in the data table of the ORM database.

After the local user saves the input, the input data is stored in the data extract information table in the ORM database of the computer system. The computer system then analyzes the data file, maps the data in the organization's data file to a new data table, and copies the data into the new data table (referenced as data tables 1, 2, 3 in FIG. 7 and FIG. 20) within the ORM database of the computer system.

Figure 20:
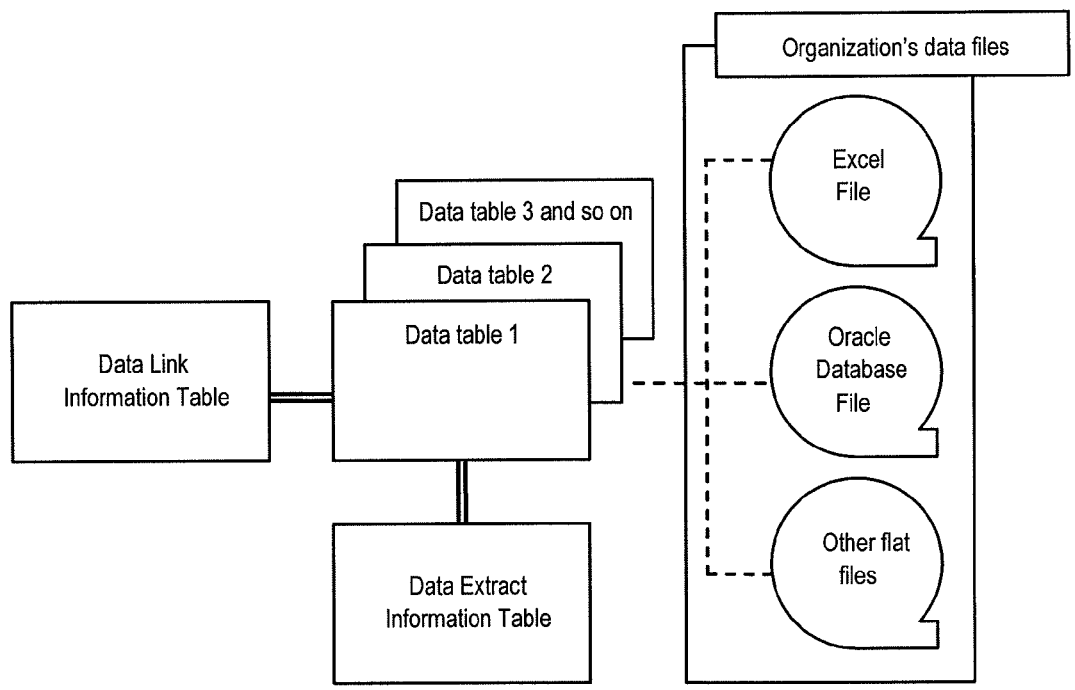
FIG. 20 shows source data contained in data files according to an embodiment.

Finally, the computer system automatically completes the data link information table using the new data table name as the data link name, "ORM Database" as the source database, and the server, port and credentials using ORM database server information establishing a relationship between the new data table and the computer system as illustrated in FIG. 20.

3. Creating Datasets

As previously stated, the dataset information table contains the dataset elements used by the computer system to determine the population of records that will be evaluated during execution of the control tool. For example, a control tool may be developed by a local user that, amongst other things, validates the integrity and accuracy of new employee data that is input into the organization's human resources system each day. A dataset element that determines the validation population could be, for example, those employees with a hire date equal to the previous day.

Table elements from the data collection information table in the ORM database can be used individually or combined to create the dataset elements of the new dataset using design templates (see FIG. 19). In order to create a dataset table, the user considers the:
1) Table elements to be included in the dataset; and,
2) Any conditions to be applied when generating the table elements.

In a user interface within the control module of the computer system, the local user inputs the required fields as referenced in FIG. 19:
1) Dataset name. The local user inputs the name of the dataset table in an alphanumeric field.
2) Dataset Element Name: The local user inputs the name of the dataset element being added to the dataset within the ORM database in the computer system.
3) Data Element: The local user is presented by the computer system with a subset of table columns for the selected database table that have been stored in the data collection information table of the ORM database using the method previously described. The user selects a table column from the list. This data element will be automatically attached to the dataset element name by the ORM application of the computer system.
4) Function: The local user can select arithmetic or logical functions (e.g., concatenate, add, subtract, multiply, divide, greater than, less than, equal, in, or not in) and other criteria variable (such as another data element or a constant like a value or date), to modify the application of the data element in the dataset.
5) Variable: The local user can select from a list of variable options presented by the computer system:
   a. Data Element: If the data element variable is selected, the local user can select a table column as described previously in this section.
   b. Constant: If the constant variable is selected, the local user can input text, value or fixed date.
   c. Variable Date: If the variable date variable is selected, the user can select from the user interface either day, month, year or today's date. If day, month or year is selected the user inputs the day number, month number or year number.

The user can apply one or many conditions to a data element which further narrows the population of records that will be reviewed by the computer system during control tool execution. In order to create conditions, the local user selects the 'Add a condition' function from the user interface. Using the interface, the user selects a joining operand (e.g., and, or, '(',')') and repeats steps 3 through 5 above as may be appropriate.

In addition, the user can add on or more data elements to the dataset by selecting the 'Add another data element' function from the user interface. Using the interface, the user repeats steps 2 through 5 above as may be appropriate for the new data element.

Rather than use the basic methods as shown in FIG. 19 and described above, advanced users have the option of creating datasets using the free-form dataset design template also shown in FIG. 19. Using the advanced method user interface, a user can create one or more dataset elements and write the conditions for the dataset element using SQL language. In other embodiments, other database languages may be used.

Once saved, the computer system writes a standard SQL statement (except when the SQL statement was written by the user in the advanced method) and links the returned columns to the respective dataset elements. The SQL statement will be performed when the control tool is executed. In other embodiments, other database languages may be used.

Upon user selection of the 'save' function from the user interface, the computer system validates the integrity of the dataset. If the dataset fails the computer system's test procedure, the user receives a failure message. For example, if the user selects dataset elements from multiple tables in the data collection information table, the user must ensure that at least one dataset element is common between each of the tables (e.g., employee ID). Otherwise, the input data is stored in the dataset information table within the ORM database of the computer system.

4. Create Control Tools

The local user accesses the computer system to create a control tool by performing the following operations through the web server in a user interface:
   1) Input control tool specifications; and,
   2) Input control tool attributes.

A. Inputting Control Tool Specifications

In a user interface within the computer system, the local user inputs the required fields as referenced in FIG. 22:
   1) Control Tool Name: The user inputs the name of the control tool (e.g., "Large dollar transaction review") in an alphanumeric field.
   2) Frequency: The user selects the frequency by which the review is conducted (e.g., daily).
   3) Time: The user inputs the scheduled time of day the control tool will execute. Not applicable to 'Static' control tool types (static types are discussed further below).
   4) Control Tool Start Date: The user inputs the date that the control tool is to begin execution.
   5) Lock/Unlock: The user selects the option of locking or unlocking the control tool. When unlocked, the computer system will not execute the control tool. Since 'Static' control tools are not executed by the ORM application, this option is not applied to such control tools.
   6) Control Tool Termination Date: The user inputs the sunset date of the control tool; generally, this field has a null value.
   7) Control Tool Type: The user can select either 'Dynamic', 'Static', or 'Semi-Dynamic'. By selecting 'Dynamic', the user has indicated that the computer system will perform the entire control tool without human intervention using data collected from the organization's databases and data files during control tool execution. 'Static' means that the computer system will assist the person performing the control activity (e.g., a supervisor) using data collected by user input during control tool execution. 'Semi-Dynamic' means that the computer system will perform some elements of the control tool while the person performing the control activity performs other elements of the control tool.
   8) Dataset: Should the user select either a 'Dynamic' or 'Semi-Dynamic' tool type, the local user is presented by the computer system with a subset of the datasets that have been stored in the dataset information table of the ORM database using the method previously described. The user selects a dataset from the list.
   9) Grace Period: Should the user select either 'Static' or 'Semi-Dynamic', the user inputs the time period within which the control tool is to be performed, before an issue is reported to management. For example, if a control tool is set with a frequency of weekly with a grace period of 1 day, the person performing the control tool has until day 8 to perform the tool. On day 9, the unperformed control tool would be reported to management as an internal control breakdown.

After the local user saves the input, the input data is stored in the control tool table in the ORM database of the computer system.

B. Inputting Control Tool Attributes

As previously stated, the computer system prompts the user to create the control tool attributes that comprise the control procedure within the enhanced control tool. In this specific embodiment, there are two types of control tool attributes that are used by the computer system to perform a control procedure:
   1) Data capture control tool attributes; and,
   2) Data analysis control tool attributes.

A data capture control tool attribute is a collection of criteria used by the computer system to record the control tool data elements and values that are used during execution of the control tool, for example as part of an audit trail. The check number, date and amount are examples of data capture attributes.

A data analysis control tool attribute is a collection of analysis criteria used by the computer system to perform a specific control procedure during execution of the control tool (e.g., Verify that the check amount from the check register agrees to the check amount on the bank statement). A data analysis attribute can be input by the user to, for example, result in a 'true' or 'false' decision outcome when executed by the control tool. When the 'true' or 'false' decision is assessed against a standard input by the user, the computer system can determine whether or not a defect exists.

For example, if the check amount on the check register that does not agree to the check amount on the bank statement, then the logical decision outcome is 'false'. If the standard for the data analysis attribute is set by the user as 'true', then the 'false' condition represents a defect.

Using a web-based interface, the computer system presents the local user with an option to create either a data capture attribute or data analysis attribute. Based upon the user's selection, the computer system presents the user with the required fields to be input through the web server in a user interface, as described below.

1) Inputting Data Capture Attributes

In a user interface within the computer system, the local user inputs the required fields as referenced in FIG. 23:

a. Control Tool Attribute: The local user inputs the name of the control tool attribute (e.g., "Application ID") in an alphanumeric field.

b. Control Tool Attribute Description: The local user can input into a free text field verbiage to describe the control tool attribute.

c. Genesis Attribute: The user selects whether or not this control tool attribute is the first attribute to be performed during control execution.

d. Control Tool Attribute Type: The computer system has previously pre-populated this field as 'data capture' based upon the local user's selection above.

e. Successor Control Tool Attribute Type: As mentioned earlier, a successor attribute is the attribute that will be performed next in the control tool. The successor control attribute type for a data capture attribute is 'Single Successor Attribute'. For a single successor attribute type, the computer system presents a subset of control tool attributes that have been input for the selected control tool; and, the local user selects the successor control tool attributes from the list.

Initially, the list is empty, but grows as new control tool attributes are input by the user for the control tool. Later, the control tool attribute can be edited by the user to link the appropriate successor control tool attribute from the subset of control tool attributes presented by the computer system once it has been input.

f. Control Tool Data Element: The local user is presented by the computer system with a subset of table columns and dataset elements from the selected database table that have been stored in the data collection information table and the dataset information table of the ORM database using the methods previously described. The user selects an item from the list.

g. Function: The local user can select arithmetic or logical functions (e.g., concatenate, add, subtract, multiply, divide, greater than, less than, equal, in, or not in) and other criteria variable (such as another control tool data element or a constant like a value or date), to modify the application of the control tool data element in the control tool attribute.

h. Variable: The local user can select from a list of variable options presented by the computer system:

i. Control Tool Data Element: If the 'control tool data element' variable is selected, the local user makes a selection as described previously in this section.

ii. Constant: If the 'constant' variable is selected, the local user can input text, value or fixed date.

iii. Variable Date: If the 'variable date' variable is selected, the user can select from the user interface the day, month, or year or today's date. If day, month or year is selected the user inputs the day number, month number or year number.

iv. Data Capture Attribute: If the 'data capture attribute' variable is selected, the user can select a data capture attribute from a subset of data capture control tool attributes that have been input for the selected control tool.

The user can apply one or many conditions to a control tool data element which expands the criteria for the control tool attribute during control tool execution. In order to create conditions, the local user selects the 'Add a condition' function from the user interface. Using the interface, the user selects a joining operand (e.g., and, or, '(',')') and repeats steps (f) through (h) above as may be appropriate.

Rather than use the methods as shown in FIG. 23 and described above, advanced users have the option of creating data capture control tool attributes using the free-form design template also shown in FIG. 23. Although step (a) through (e) are the same as shown above, using the advanced method user interface, a user can write the conditions for the control tool attribute using SQL language. In other embodiments, other database languages may be used.

Once saved by the user, the computer system validates the selections and conditions, and converts it into a standard SQL statement (except when the SQL statement was written by the user in the advanced method). The SQL statement will be performed when the control tool is executed. In other embodiments, other database languages may be used.

2) Inputting Data Analysis Attributes

In a user interface within the computer system, the local user inputs the required fields as referenced in FIG. 24:

a. Control Tool Attribute: The local user performs input as described in the previous section.

b. Control Tool Attribute Description: The local user performs input as described in the previous section.

c. Genesis Attribute: The local user makes a selection as described in the previous section.

d. Control Tool Attribute Type: The computer system pre-populates this field as 'data analysis' based upon the local user's selection above.

e. Standard: As described previously, the user can select a standard for the data analysis control tool attribute as 'Yes/True' or 'No/False' or 'N/A'.

f. Tolerable Error Rate: As previously mentioned, the user can input the tolerable error for the control tool attribute. The tolerable error rate is a percentage that is input by the local user and used by the computer system for comparison to the actual error rate. When actual error rate exceeds the tolerable error rate, managerial notifications (e.g., reports, emails) are triggered from the ORM application to heighten awareness and remediation of the issue.

g. Successor Control Tool Attribute Type: As mentioned earlier, a successor attribute is the attribute that will be performed next in the control tool. The successor control attribute type for a data analysis attribute can either be a 'Single Successor Attribute' or 'Logical Successor Attribute'.

i. Single Successor Attribute: If the 'Single Successor Attribute' is selected, the local user makes a selection as described in the previous section.

ii. Logical Successor Attribute: As stated previously, a data analysis control tool attribute can result in a 'true' or 'false' decision outcome. If the 'Logical Successor Attribute' is selected, the computer system presents a subset of control tool attributes that have been input for the selected control tool; and, the local user selects the successor control tool attribute from the list for the 'true' condition. Similarly, the user can select successor control tool attribute from the list for the 'false' condition.

h. Control Tool Data Element: The local user makes a selection as described in the previous section.
i. Function: The local user makes a selection as described in the previous section.
j. Variable: The local user can make selections and perform input as described in the previous section.

The user can apply one or many conditions to a control tool data element which expands the criteria for the control tool attribute during control tool execution as described in the previous section.

Rather than use the methods as shown in FIG. 24 and described above, advanced users have the option of creating data analysis control tool attributes using the free-form design template also shown in FIG. 24. Although step (a) through (f) are the same as shown above, using the advanced method user interface, a user can create one or more dataset elements and write the conditions for the dataset element using SQL language. In other embodiments, other database languages may be used.

Once saved, the computer system builds a standard SQL statement (except when the SQL statement was written by the user in the advanced method) and links the returned columns to the respective dataset elements. The SQL statement will be performed when the control tool is executed. In other embodiments, other database languages may be used.

D. Control Tool Execution

As mentioned previously, the stored user input values for the frequency and time of control tool execution is maintained in the control tool table of the ORM database in the computer system. Except for 'Static' control tool types which are not systemically executed by the ORM application, at the scheduled time of occurrence, the computer system automatically launches the control tool.

Applying the dataset stored for the control tool, the computer system obtains the population of records that will be evaluated during execution of the control tool. Beginning with the first record in the dataset, the computer system performs the control tool attribute sequence beginning with the genesis control tool attribute. Once the genesis attribute has been performed, the control tool attribute result is stored in the control execution table within the ORM database. Based upon the control tool attribute result, the computer system selects the appropriate successor attribute and performs the next process step. The control tool repeats these actions until there are no additional successor attributes to be performed. At that time, the control procedure is complete for the first record in the dataset and the control tool advances to the next record. This process is repeated for every record in the dataset.

As described above, the method involves the performance of complex control processes. Variations of the method may also be applied to different types of activities that are not readily apparent to be control processes. For example, mechanical inspections, satisfaction surveys, and quality control reviews are examples of control processes that usually may be performed using the method described above.

In addition, although the method as described has been applied to control processes, variations of the method may be applied to, for example, the performance of operational and financial processes.

E. Management Alerts

Management may be alerted as described below when significant errors and irregularities are identified by the control module during control tool execution.

As described above, after a control tool is executed, in one embodiment the control module of the ORM application compares the tolerable error rate to the actual error rate for each data analysis control tool attribute with a possible defect outcome. When the actual error rate exceeds the tolerable error rate, the computer system notifies management of the defects based upon escalation criteria, such as escalation triggers and thresholds, set by the local user. Based upon established criteria, one or many emails, for example, can be sent by the ORM application alerting management to significant issues. For example, when the actual error rate exceeds the tolerable error rate, the line manager may be notified. In the event the actual error rate exceeds the tolerable error rate by more than 25%, the division executive may be notified. Other variations include: notification when the actual error rate exceeds the tolerable rate in more than a set number of consecutive days or whenever a defect occurs for a specific data analysis control tool attribute.

As stated previously, using a user interface within the control module, the local user can link a control tool attribute to a specific business unit, process, risk and control combination within the ORM database. The user may link a data analysis control tool attribute to one or more of these combinations. To illustrate in more detail, each risk that is applied to a business unit and process has a residual risk rating based upon the effectiveness of the controls used to mitigate the risk. When the actual error rate exceeds the tolerable error rate within a predetermined margin, the residual risk for the specific risk that is linked to the data analysis attribute(s) increases in relation to the margin of error. In addition, the direction of risk is also correlated to changes error rates. Based upon the table relationships between the process and control modules of the ORM database, many report variations may be produced by the ORM application with multiple levels of data aggregation levels within both the process and control modules.

Applying the governance perspective, management can receive various reports indicating the level of compliance within the organization such as the laws, regulations or other governance with the highest violation rates, the laws, regulations and other governance with the lowest violation rates, and the business units accountable for causing the highest incidence of violations as well as trends related to risk exposure and risk direction.

Applying the process perspective, management can receive various reports of process effectiveness such as the processes that have the highest error rates, the processes with the least error rates, and the business units causing the largest number of processing errors as well as trends related to risk exposure and risk direction.

Applying the business unit perspective, management can receive various reports of division and business unit effectiveness such as the business units with the highest error rates, the business units with the least error rates, and as well as trends related to risk exposure and risk direction.

In addition, based upon the types of data collected during control tool execution, employee performance can be measured and assessed with peer group analysis performed by the ORM application.

Using a web-based interface, local users can select the reports described above from the process and control modules of the ORM application using the ORM database within the computer system. Local users can produce all of the types of reports listed at an organization and division level as well as a business unit level by the ORM application using the ORM database.

Variations of the method include, for example, text messages, error logs, and user alerts posted on an electronic bulletin board.

IX. Central Repository Design

As described earlier, many users across different organizations and industries may use their internet browser to access the web-based central repository to use or modify repository data. A specific embodiment is now described in more detail below.

Figure 9:
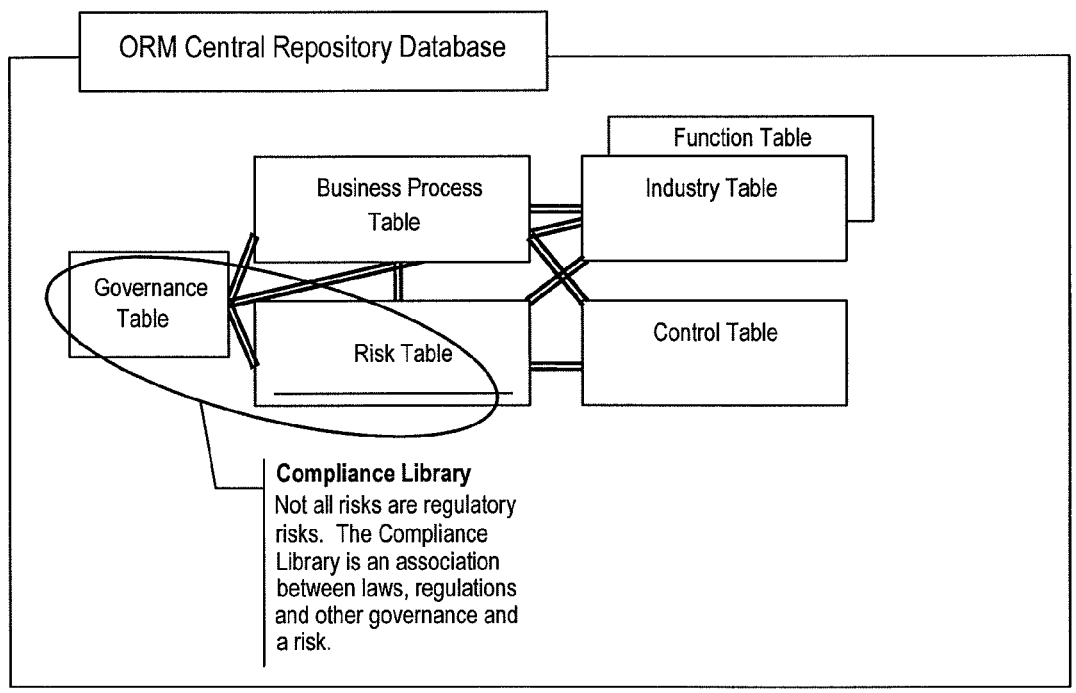
FIG. 9 shows a central repository database according to an embodiment.

As previously described in FIG. 9, using a user interface within the ORM central repository application, local users can input industries and functions which are stored in the industry table and functions table of the ORM central repository database. The user can link an industry and function to processes using a user interface within the ORM central repository application.

Local users can input business processes that are performed within that industry or function using a user interface within the central repository application which are stored in the process table of the central repository database. The local user can link a process to industries, functions, risks, and laws, regulations or other governance.

Using a user interface in the central repository application, local users can input risks associated with a business process which are stored in the risk table of the central repository database. The user can link a risk to a process, control, or law, regulation or other governance.

Local users can input controls using a user interface within the central repository application which are stored in the control table of the central repository database. The user can link a control to a risk for a specific process. Local users from any organization can perform the functions described.

When the local user's organization operates the computer system described above, in one embodiment selected business process, risk and control data may be copied from the central repository database to the ORM database of the local user's organization using one of the following procedures:
1) Using a web-based user interface with the ORM central repository, the local user selects the data for transmission to the ORM database of the local user's organization. After selecting the data, the user may immediately transmit the information to the ORM database through the web service by selecting the "Transmit data from Repository" function (not shown) from the user interface within the central repository. When the information is received by the computer system in the user's organization, the ORM application within the computer system will perform the data transfer synchronous and asynchronous depending on the information load and relationships of selected information bits (process, risks, etc.). The computer system of the local user's organization validates the information for accuracy and duplication. and stores the data into the ORM database; or,
2) If the local user's organization does not have web service connectivity with the ORM central repository, using a web-based user interface with the ORM central repository, the local user selects the data to be copied to the ORM database of the local user's organization. Using a web-based user interface with the ORM central repository, the local user selects the "Copy data from Repository" function (not shown) from the user interface within the central repository and the central repository copies the data into an XML file. Using a web-based interface within the computer system of the local user's organization, the local user selects the 'Copy data from Repository' function (not shown) from the process module of the ORM application. The computer system of the local user's organization validates the information for duplication, and stores the data into the ORM database.

When the local user's organization does not operate the computer system described above, the local user can still use the data contained in the central repository by:
1) Using a web-based interface of the ORM central repository, the local user can select reports from the ORM central repository application and either print the report or send the report to a downloadable file format like MS Excel, text, csv, and pdf.
2) Users can a select the desired text and copy the information to the user's desktop application (e.g., Microsoft Excel, Word).

When the local user's organization operates the computer system described above, selected data can be copied from the ORM database of the local user's organization and stored in the ORM central repository using one of the following procedures:
1) Using a web-based user interface within the process module of the ORM application within the computer system of the local user's organization, the local user selects the data for transmission to the ORM central repository. After selecting the data, the user may immediately transmit the information to the central repository through the web service by selecting the "Transmit data from ORM database" function (not shown) from the user interface within the process module of the ORM application. When the information is received by the ORM central repository, the repository will perform the data transfer synchronous and asynchronous depending on the information load and relationships of selected information bits (process, risks, etc.). The computer system of the repository validates the information for accuracy and duplication, and stores the data into the central repository database; or,
2) If the local user's organization does not have web service connectivity with the ORM central repository, using a web-based user interface with the computer system of the local user's organization, the local user selects the data to be copied to the ORM central repository. Using a web-based user interface within the process module of the computer system of the local user's organization, the local user selects the "Copy data from ORM database" function (not shown) from the user interface within process module of the computer system and the system copies the data into an XML file. Using a web-based interface within the central repository, the local user selects the 'Copy data from ORM database' function from the process module of the ORM application (not shown). The computer system of the repository validates the information for duplication, and stores the data into the ORM central repository database.

Users of the ORM central repository can elect to receive automatic email notifications when additions or changes are made to the ORM Central Repository that meets the requirements specified in the user preferences (e.g., financial industry). When the local user's organization operates the computer system described above, the user can receive an automatic update of selected information that is automatically downloaded from the central repository into the ORM application using the method described above. An update preview is available within the process module for the user to review the information that the downloaded file contains. The user may, for example, select or reject each item in the downloaded file using a web-based interface. Accepted data is loaded into the ORM database.

As described above, the method involves the repository database which currently manages relationships between industries, functions, processes, risks, controls, and compliance library, data input by users, and the distribution of the data. However, as described previously, there are other forms of risk management relationships and variations of the method may be applied to other categories, such as, vendors and systems.

Variations of the notification method include, for example, text messages, error logs, and user alerts posted on an electronic bulletin board. In addition, there are other available variations to the method of uploading and downloading central repository data.

X. Exemplary Hardware and Software Platforms

It should be noted that the references to "ORM" above and in the Figures are only intended for purposes of aiding in the illustration of specific embodiments, and such references are not intended to be limiting as to generality of the new methods and systems described above.

The ORM application may be implemented, for example, as a web-based application using Java. An example of one hardware platform is provided below, but other variations may be used. The software described in this application may be stored, for example, on a hard drive for application processing (and a back-up or other copies may be stored in various other computer-readable media such as, for example, flash memory, DVD, and external hard-drives). The software in general comprises computer-executable instructions for operating the computer system above.

The ORM database may be, for example, any DBMS database like Oracle, SQL Server, MySQL (e.g., in one or more databases coupled to appropriate computer hardware and memory). Windows, UNIX and Linux are supported operating systems. The ORM application may run on any hardware (e.g., one or more server computers) which supports these operating systems. With the exception of any LAN/WAN specifications, the following is an exemplary list of hardware and software specifications that may be used to install, use and maintain the software:
 1. Server Software
  A. WebSphere 5.2 (or Higher version)
  B. Oracle 9i (or Higher version) Database Enterprise Edition (To be installed on Database Server)
 2. Server Hardware (2 Servers)
  A. Web and Application Server
   1) 2*450 MHz processors
   2) 2 GB Memory
   3) 54 GB Disk Space
   4) WIN NT or WIN 2000) or Solaris 9, Linux
  B. Database Server
   1) 2*450 MHz processors
   2) 2 GB Memory
   3) 72 GB Disk Space
   4) WIN NT, WIN 2000) or Solaris 9, Linux
 3. End User Software
  A. Microsoft Windows® 98 operating system or later
  B. Microsoft Internet Explorer® Web Browser (Version 5.0 or later)
 4. End User Hardware
  A. Personal computer or laptop with a Pentium III class processor or higher
  B. 512 megabytes (MB) of RAM
  C. 100 MB of available hard-disk space required
  D. Ethernet Card for connection to the Intranet or network Local users can access the web server (ORM application) through the HTTP or HTTPS communication protocols using a web browser.

In general, the processing described for the software used to implement the new methods and systems discussed above may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

The invention claimed is:

1. A method, comprising:

receiving, via a computer system, a location of one or more data files, and credentials necessary for the computer system to access the one or more data files, wherein the one or more data files contain source data;

storing the location and the credentials in at least one database accessible by the computer system;

receiving, from a user, a collection of attributes that defines a procedure executed by a control tool in performing at least a portion of the attributes, each respective attribute having a data structure defined by the user, the collection of attributes including a genesis attribute that defines a starting attribute performed by the control tool, and the collection of attributes further including a first successor attribute, a second successor attribute, and a third successor attribute, wherein:

the data structure for each respective attribute of the collection of attributes defines a plurality of data elements, each data element associated with a function;

the data structure for each respective attribute of the collection of attributes defines at least one joining operand for the plurality of data elements;

the data structure of the first successor attribute defines the second successor attribute performed based on a true decision outcome and the third successor attribute performed based on a false decision outcome; and each respective attribute of the collection of attributes includes a respective tolerable error rate used for determining whether a number of defects are within an acceptable range;

obtaining, via the computer system, a plurality of records from the source data, each record evaluated during execution of the control tool;

executing, using the computer system, the control tool comprising performing the genesis attribute followed by performing the first successor attribute, and performing the second successor attribute based on obtaining a true decision outcome from performing the first successor attribute;

storing a plurality of results from the executing of the control tool;

ending execution of the control tool when there are no additional successor attributes to be performed;

comparing the tolerable error rate to the actual error rate for each respective attribute of the collection of attributes; and sending or outputting at least one alert when the actual error rate exceeds the tolerable error rate for one or more of the collection of attributes by a predefined threshold.

2. The method of claim 1, wherein the location of the one or more data files is received from the user via a web-based user interface.

3. The method of claim 1, further comprising receiving a frequency for execution of the control tool, and periodically launching, via the computer system, the control tool based on the frequency.

4. The method of claim 1, wherein the executing the control tool further comprises determining a respective result for each respective attribute of the collection of attributes, and the storing comprises storing each respective result in a table.

5. The method of claim 1, further comprising:
using the location and the credentials to obtain the plurality of records, the plurality of records including a first record and a second record;
wherein the executing the control tool further comprises executing the control tool for the first record, then executing the control tool for the second record.

6. The method of claim 1, further comprising linking the control tool with a first division of an organization.

7. The method of claim 1, wherein each respective attribute of the collection of attributes is associated with a data capture attribute type or a data analysis attribute type.

8. The method of claim 1, wherein the data files comprise at least one of a database and a flat file.

9. A non-transitory computer-readable storage medium storing computer-readable instructions, which when executed, cause a computer system to:
receive a location of one or more data files, wherein the one or more data files contain source data;
store the location for access by the computer system;
receive a definition of a collection of attributes defining a procedure for use when executing a control tool, each respective attribute having a data structure defined by a user, and the collection of attributes including a genesis attribute that defines a starting attribute, and the collection of attributes further including first, second, and third successor attributes, wherein the data structure of the first successor attribute defines the second successor attribute performed for a true decision outcome and the third successor attribute performed for a false decision outcome, and wherein:
the data structure for each respective attribute of the collection of attributes defines a plurality of data elements, each data element associated with a function;
the data structure for each respective attribute of the collection of attributes defines at least one joining operand for the plurality of data elements; and
each respective attribute of the collection of attributes includes a respective tolerable error rate used for determining whether a number of defects are within an acceptable range;
obtain a plurality of records based on the source data, each record evaluated during execution of the control tool;
execute, using the computer system, the control tool comprising performing the genesis attribute followed by performing the first successor attribute, and performing the second successor attribute based on a true decision outcome from performing the first successor attribute;
compare the tolerable error rate to the actual error rate for each respective attribute of the collection of attributes; and
send an alert communication when the actual error rate exceeds the tolerable error rate for one or more of the collection of attributes by a predefined threshold.

10. The storage medium of claim 9, wherein the executing the control tool further comprises determining a respective result for each respective attribute of the collection of attributes, and storing each respective result in a table.

11. The storage medium of claim 9, wherein the instructions further cause the computer system to:
use the location to obtain the plurality of records, the plurality of records including a first record and a second record;
wherein the executing the control tool further comprises executing the control tool for the first record, then executing the control tool for the second record.

12. A system, comprising:
at least one processor; and
memory storing instructions configured to instruct the at least one processor to:
receive a location of one or more data files;
receive a collection of attributes that defines a procedure executed by a control tool in performing at least a portion of the attributes, each respective attribute having a data structure defined by a user, the collection of attributes including a genesis attribute that defines a starting attribute performed by the control tool, and the collection of attributes further including a first successor attribute, a second successor attribute, and a third successor attribute, wherein the data structure of the first successor attribute defines the second successor attribute performed based on a true decision outcome and the third successor attribute performed based on a false decision outcome, and wherein:
the data structure for each respective attribute of the collection of attributes defines a plurality of data elements, each data element associated with a function;
the data structure for each respective attribute of the collection of attributes defines at least one joining operand for the plurality of data elements; and
each respective attribute of the collection of attributes includes a respective tolerable error rate used for determining whether a number of defects are within an acceptable range;
obtain a plurality of records using the location of the data files, each record evaluated during execution of the control tool;
execute the control tool comprising performing the genesis attribute followed by performing the first successor attribute, and performing the second successor attribute based on obtaining a true decision outcome from performing the first successor attribute;
compare the tolerable error rate to the actual error rate for each respective attribute of the collection of attributes; and
send or output at least one alert when the actual error rate exceeds the tolerable error rate for one or more of the collection of attributes by a predefined threshold.

13. The system of claim 12, wherein the location of the one or more data files is received from the user via a web-based user interface.

* * * * *

UNITED STATES PATENT AND TRADEMARK OFFICE
CERTIFICATE OF CORRECTION

PATENT NO. : 8,533,109 B2
APPLICATION NO. : 12/544142
DATED : September 10, 2013
INVENTOR(S) : Vanga et al.

It is certified that error appears in the above-identified patent and that said Letters Patent is hereby corrected as shown below:

IN THE SPECIFICATION

In Column 3, Lines 45-46, delete "an corporation)" and insert -- a corporation) --, therefor.

In Column 5, Line 15, delete ""control module"" and insert -- "control module". --, therefor.

In Column 19, Line 25, delete "add on or" and insert -- add one or --, therefor.

In Column 25, Lines 55-56, delete "duplication." and insert -- duplication --, therefor.

In Column 27, Line 52, delete "WIN 2000) or Solaris 9," and
insert -- WIN 2000, or Solaris 9, --, therefor.

In Column 27, Line 57, delete "WIN 2000) or Solaris 9," and
insert -- WIN 2000, or Solaris 9, --, therefor.

Signed and Sealed this
Fifth Day of November, 2013

Teresa Stanek Rea
*Deputy Director of the United States Patent and Trademark Office*